United States Patent
Wenderoth et al.

(10) Patent No.: US 11,530,099 B2
(45) Date of Patent: Dec. 20, 2022

(54) PLATE ADVANCEMENT MECHANISM FOR ROOFING TOOL

(71) Applicant: OMG, Inc., Agawam, MA (US)

(72) Inventors: Jonathan Wenderoth, Boston, MA (US); Kurt M. Maw, Salem, MA (US); Catherine Hildersley, Boston, MA (US); Cedric Delmy, Chicopee, MA (US); Peter J. Shadwell, Longmeadow, MA (US); Joshua S. Kelly, Longmeadow, MA (US)

(73) Assignee: OMG, Inc., Agawam, MA (US)

( * ) Notice: Subject to any disclaimer, the term of this patent is extended or adjusted under 35 U.S.C. 154(b) by 0 days.

(21) Appl. No.: 17/318,498

(22) Filed: May 12, 2021

(65) Prior Publication Data
US 2021/0354936 A1    Nov. 18, 2021

Related U.S. Application Data

(60) Provisional application No. 63/023,425, filed on May 12, 2020.

(51) Int. Cl.
*B65G 59/06*    (2006.01)
*E04D 15/04*    (2006.01)

(52) U.S. Cl.
CPC .......... *B65G 59/067* (2013.01); *E04D 15/04* (2013.01); *B65G 2201/022* (2013.01)

(58) Field of Classification Search
CPC .......... B65G 59/067; B65G 2201/022; E04D 15/04; B25B 21/00

(Continued)

(56) References Cited

U.S. PATENT DOCUMENTS

| 4,541,547 A | * | 9/1985 | Miknyocki | G07D 1/08 |
| | | | | 453/39 |
| 4,890,968 A | * | 1/1990 | Beach | E04D 5/145 |
| | | | | 405/259.1 |

(Continued)

FOREIGN PATENT DOCUMENTS

| CA | 2169405 A | * 10/1996 | ........... B25B 21/002 |
| DE | 4008782 C1 | *  9/1991 | .............. F16B 43/00 |

(Continued)

OTHER PUBLICATIONS

PCT International Search Report and Written Opinion for PCT/US2021/031967 filed May 12, 2021; dated Sep. 7, 2021 (Jul. 9, 2021); 14 pgs.

*Primary Examiner* — Rakesh Kumar
(74) *Attorney, Agent, or Firm* — Alix, Yale & Ristas, LLP

(57) ABSTRACT

A plate advancement mechanism is configured to cooperate with a stack of plates consisting of alternating first and second roofing plates with alternately positioned indexing notches along an indexing edge of the plates. An indexer including at least one indexing tab that projects beneath the indexing edge of the plates reciprocates parallel to the indexing edge of the roofing plates between a first feed position and a second feed position. The indexer first feed position aligns the indexing tab with the indexing notch of the first plates and the indexer second feed position aligns said indexing tab with the indexing notch of the second plates. The indexer first feed position and said second feed position are coordinated with shuttle movement to release the lowermost roofing plate from the stack onto the shuttle by aligning the indexing tab (or tabs) with the indexing notch (or notches) of the lowermost plate.

12 Claims, 21 Drawing Sheets

(58) Field of Classification Search
USPC .................................. 221/268, 273, 276, 199
See application file for complete search history.

(56) References Cited

U.S. PATENT DOCUMENTS

| | | | | |
|---|---|---|---|---|
| 5,042,142 A | * | 8/1991 | Beach | B25B 23/04 |
| | | | | 227/111 |
| 5,042,143 A | * | 8/1991 | Holleman | A61N 1/056 |
| | | | | 29/605 |
| 5,056,684 A | | 10/1991 | Beach et al. | |
| 5,058,464 A | * | 10/1991 | McGovern | B25B 21/002 |
| | | | | 81/433 |
| 5,067,702 A | | 11/1991 | Muraishi et al. | |
| 5,347,707 A | * | 9/1994 | Beach | E04D 15/04 |
| | | | | 81/433 |
| 5,447,299 A | * | 9/1995 | May | B65H 39/00 |
| | | | | 271/99 |
| 5,584,415 A | * | 12/1996 | Beach | B25B 21/002 |
| | | | | 221/241 |
| 5,673,816 A | * | 10/1997 | Larson | B25B 23/06 |
| | | | | 221/199 |
| 5,921,454 A | * | 7/1999 | Larson | B25B 21/002 |
| | | | | 227/138 |
| 6,142,352 A | | 11/2000 | Larson et al. | |
| 6,273,315 B1 | * | 8/2001 | McGuinness | B25C 5/1693 |
| | | | | 227/138 |
| 6,908,022 B2 | * | 6/2005 | Schmitz | B25C 5/1693 |
| | | | | 227/18 |
| 7,500,588 B2 | * | 3/2009 | McGuinness | B25C 5/1693 |
| | | | | 227/138 |
| 10,399,215 B2 | * | 9/2019 | DeFoe | B23P 19/08 |
| 2016/0032591 A1 | * | 2/2016 | Arai | B23P 19/006 |
| | | | | 81/434 |
| 2021/0354936 A1 | * | 11/2021 | Wenderoth | B65G 59/067 |

FOREIGN PATENT DOCUMENTS

| | | | | |
|---|---|---|---|---|
| EP | 1550778 A2 | * | 7/2005 | ........... B25B 21/002 |
| WO | WO-9638268 A1 | * | 12/1996 | ............ B25C 1/006 |

* cited by examiner

PLATE ADVANCEMENT MECHANISM FOR ROOFING TOOL

BACKGROUND

This disclosure relates generally to roofing plates and tools for dispensing individual roofing plates from a stack. More particularly, this disclosure relates to a tool for advancing a single roofing plate from a stack into alignment with a tube for driving a fastener to attach the plate to a roofing structure. Preferably, advancement of a plate from the stack and driving of the fastener are initiated in opposite reciprocal motions optionally in synergy with advancing a fastener into driving position, yielding an automated reliable installation tool.

In the roofing industry, plates are used for securing a substrate to a decking structure by means of a fastener driven through a hole in the plate. For example, in roofing installations to which the present application is particularly applicable, a plurality of metallic roofing plates are secured above a substrate layer of thermal insulation material via fastener driven through an opening in the center of the plate into an underlying substructure. Thereafter, a waterproof membrane is laid over the plates and substrate and attached to the roofing system, typically via one or more of mechanically, via adhesive and induction welding to the plates.

Tools exist for assisting attachment of the plates to the roofing substructure by automatically advancing a plate into a position for attachment via an elongate fastener. Plates are thin and rigid metallic plates, typically with ridges or corrugations in them. When plates are stacked on top of one another, it has proven difficult to reliably separate individual plates from the stack into a position for attachment to the roof structure. Double feeding of roofing plates in a dispensing machine is relatively common in the roofing industry. Other common problems exist, such as over- or under-driving fasteners used to secure plates, no plate being fed into attachment position and other feed fault issues.

Further, in many known attachment systems, at least two individual installers are required for aligning, laying, and attaching plates. In an industry that is widely viewed to be short on labor, it would be very desirable to provide a system that improves productivity in terms of speed and reducing the number of individuals required for installation.

Thus, it would be useful to provide a roofing plate advancement and attachment tool that assists in overcoming these drawbacks and obstacles, including double feeding, missed feed and other feed faults, all while improving productivity and reducing workforce burden. It would additionally be useful to provide such a tool that operates in a simple manner and automatically incorporates accurate plate advancement steps into normal operation of a tool that also attaches plates to the roofing structure.

SUMMARY OF THE DISCLOSURE

Embodiments of a plate advancement mechanism and method of advancing plates address the deficiencies of the prior art by employing a stack of plates consisting of alternating first and second roofing plates with alternately positioned indexing notches along an indexing edge of the plates. The plates may be generally square, rectangular, or polygonal and include one or more indexing notches on the indexing edge and a trailing edge perpendicular to the indexing edge. The indexing notch or notches of the first plates located in a first position along the indexing edge and the notch or notches of the second plates located in a second position along the indexing edge.

Embodiments of the plate advancement mechanism may be incorporated into a roofing tool with a body that defines a container configured to accommodate the stack of roofing plates. The body of the roofing tool defines an opening for receiving roofing plates and an opening beneath the stack of roofing plates for dispensing the lowermost plate from the stack. The plate advancement mechanism includes a shuttle mounted to the body for horizontal movement between a feed position and a plate releasing position. The shuttle includes a projection configured to engage the trailing edge of a plate released from the stack onto the shuttle when the shuttle is in the feed position. Movement of the shuttle from the feed position to the plate releasing position advancing the lowermost plate from a position aligned beneath the stack to the plate releasing position displaced from beneath the stack.

The plate advancement mechanism includes an indexer mounted to the body of the roofing tool for reciprocal movement parallel to the indexing edge of said roofing plates between a first feed position and a second feed position. The indexer includes at least one indexing tab projecting beneath the indexing edge of the plates. The indexer first feed position aligns the at least one indexing tab with the at least one indexing notch of the first roofing plates and the indexer second feed position aligns the at least one indexing tab with the at least one indexing notch of the second roofing plates. The indexer alternates between the first feed position and the second feed position in coordination with shuttle movement between the feed position and the plate releasing position to release the lowermost roofing plate from the stack onto the shuttle by aligning the indexing tab (or tabs) with the indexing notch (or notches) of the lowermost plate, whereby the indexing edge of the lowermost plate is not supported by the indexing tab (or tabs) and falls onto the shuttle while the next plate in the stack is supported by the at least one indexing tab because the indexing tab (or tabs) is not aligned with the indexing notch (or notches) of the next plate in the stack. The projection of the shuttle engages the trailing edge of the lowermost plate as the shuttle moves from the feed position to the plate releasing position to separate only the lowermost plate from the stack and advance the lowermost plate to the plate releasing position.

According to aspects of the disclosure, the plate advancement mechanism includes a rail that supports an edge of the stack of roofing plates opposite the indexing edge, with the stack of roofing plates supported by the rail on one side and by the indexing tab (or tabs) on the opposite indexing edge. When the lowermost plate is released by alignment of the indexing tab (or tabs) with the indexing notch (or notches) of the lowermost plate, the indexing edge of the lowermost plate falls onto the shuttle while the opposite edge of the lowermost plate remains supported by the rail.

According to aspects of the disclosure, the shuttle includes a raised platform and a recessed receptacle. A wall separates the receptacle from the raised platform and defines a rear limit of the receptacle. The wall on the shuttle is substantially perpendicular to a floor of the receptacle and substantially parallel to the trailing edge of the roofing plates in the stack. When the shuttle is in the feed position, the released indexing edge of the lowermost plate falls to the floor of the receptacle and the wall overlaps with the trailing edge of the lowermost plate. The wall may overlap at least a portion of the trailing edge of the lowermost plate, and in a preferred embodiment the wall overlaps with a majority of the trailing edge of the lowermost plate although this is not required. The wall does not overlap with any of the trailing edge of the next plate in the stack, which remains supported at the indexing edge by the indexing tab (or tabs) and at the opposite edge by the rail.

The roofing tool may have a telescoping member movable between an extended position and a compressed position and biased toward the extended position. The extended position corresponds to the resting state of the roofing tool at the beginning of a plate advancement cycle and may also correspond to the beginning of a fastener driving cycle in a roofing tool configured to both dispense plates and secure the plates by driving a fastener through each plate. The telescoping member is mechanically connected to the disclosed plate advancement mechanism by a bell crank to translate axial movement of the telescoping member into rotational and linear forces applied to the components of the plate advancement mechanism. In some embodiments of a plate advancement mechanism, a cross pin extends through the body of the roofing tool and the shuttle. Opposite sides of the body define slots parallel with a direction of movement of the shuttle between the feed position and the plate releasing position. According to aspects of the disclosure, the cross pin extends through the slots in the body of the roofing tool and through the indexer, the indexer overlapping with a path of travel of the cross pin at a cross pin position corresponding to the feed position of the shuttle and at a cross pin location corresponding to the plate dispensing position of the shuttle. The indexer supports a feed latch moveable between a latched position extending across the cross pin path of travel and a displaced position not extending across the cross pin path of travel. According to aspects of the disclosure, contact between the cross pin and the feed latch when the feed latch is in the latched position shifts the indexer from the first feed position to the second feed position, and the plate advancement mechanism is configured to move the feed latch from the latched position to the displaced position on alternate cycles of shuttle movement between the feed position and the plate dispensing position.

According to aspects of the disclosure, the feed latch is connected to move with the indexer and pivots on the indexer between the latched and displaced positions. The feed latch is biased toward the latched position, the plate advancement mechanism including a cam contacting an actuation end of the feed latch to move the latch against the bias from the latched position to the displaced position. The cam includes a repeating pattern of lobes of first and second radial distance from an axis of rotation of the cam, the lobes alternately moving the feed latch from the latched position to the displaced position. A first pawl or spring arm is attached to the body of the roofing tool and engaged with the cam to permit the cam to rotate only in one direction. A bell crank pivots about an axis concentric with the axis of rotation of the cam between a lowered position and a raised position. The bell crank is connected to the telescoping member of the roofing tool so that when the telescoping member is in the extended position, the bell crank is in the raised position and when the telescoping member is in the compressed position, the bell crank is in the lowered position. The bell crank is coupled to the cross pin so that movement of the bell crank to the lowered position moves the shuttle to the feed position and opposite movement of the bell crank to the raised position moves the shuttle to the plate releasing position. The bell crank supports a second pawl or spring arm that engages with the cam during movement of the bell crank from the lowered position to the raised position to rotate the cam from a position where a lobe of the first radial height is in contact with the actuation end of the feed latch to a position where a lobe of the second radial height is in contact with the actuation end of the feed latch, the cam retained in a fixed position by the first pawl or spring arm while the bell crank moves from the raised position to the lowered position, whereby the feed latch is in the latched and displaced positions during alternate cycles of the shuttle between the feed position and the plate dispensing position.

The disclosure includes a method of advancing individual roofing plates from a stack in a roofing tool, the method comprising providing a stack of roofing plates consisting of first roofing plates alternating with second roofing plates, the first and second roofing plates having an indexing edge with an indexing notch and a trailing edge perpendicular to the indexing edge, the indexing notch of the first plates located in a first position along the indexing edge and the indexing notch of the second plates located in a second position along the indexing edge. The method comprising providing a roofing tool body configured to accommodate the stack of roofing plates, the body defining an opening for receiving roofing plates and an opening beneath the stack of roofing plates for dispensing the lowermost plate from the stack. A shuttle is provided beneath the stack and arranged to reciprocate between a feed position and a plate releasing position. An indexer is mounted to the body for reciprocal movement parallel to the indexing edge of the roofing plates between a first feed position and a second feed position, the indexer including at least one indexing tab projecting beneath the indexing edge of the plates, the indexer first feed position aligning the at least one indexing tab with the at least one indexing notch of the first roofing plates and the indexer second feed position aligning the at least one indexing tab with the at least one indexing notch of the second roofing plates. The shuttle is coupled to the indexer to release the indexing edge of the lowermost roofing plate from the stack onto the shuttle by moving the indexer to the first feed position when the shuttle is in the feed position and moving the indexer to the second feed position when the shuttle is in the plate releasing position, whereby the indexing edge of the lowermost plate is not supported by the at least one indexing tab and falls onto the shuttle while the indexing edge of the next plate in the stack is supported by the at least one indexing tab.

BRIEF DESCRIPTION OF THE DRAWINGS

Aspects of the preferred embodiments will be described in reference to the Drawings, where like numerals reflect like elements throughout.

DETAILED DESCRIPTION

Among the benefits and improvements disclosed herein, other objects and advantages of the disclosed embodiments will become apparent from the following wherein like numerals represent like parts throughout the several figures. Detailed embodiments of a plate advancement system for use in roofing are disclosed; however, it is to be understood that the disclosed embodiments are merely illustrative of the invention that may be embodied in various forms. In addition, each of the examples given in connection with the various embodiments of the invention which are intended to be illustrative, and not restrictive.

Throughout the specification and claims, the following terms take the meanings explicitly associated herein, unless the context clearly dictates otherwise. The phrase "in some embodiments" as used herein does not necessarily refer to the same embodiment(s), though it may. The phrases "in another embodiment" and "in some other embodiments" as used herein do not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on".

Further, the terms "substantial," "substantially," "similar," "similarly," "analogous," "analogously," "approximate," "approximately," and any combination thereof mean that differences between compared features or characteristics is less than 25% of the respective values/magnitudes in which the compared features or characteristics are measured and/or defined.

With reference to the drawings wherein like numerals represent like parts throughout the figures, a roofing tool employs a plate advancement mechanism for advancing a single plate P from a stack of plates to a plate releasing position where the plate will be secured to a roofing structure by an elongated fastener extending through the plate.

Figure 1:
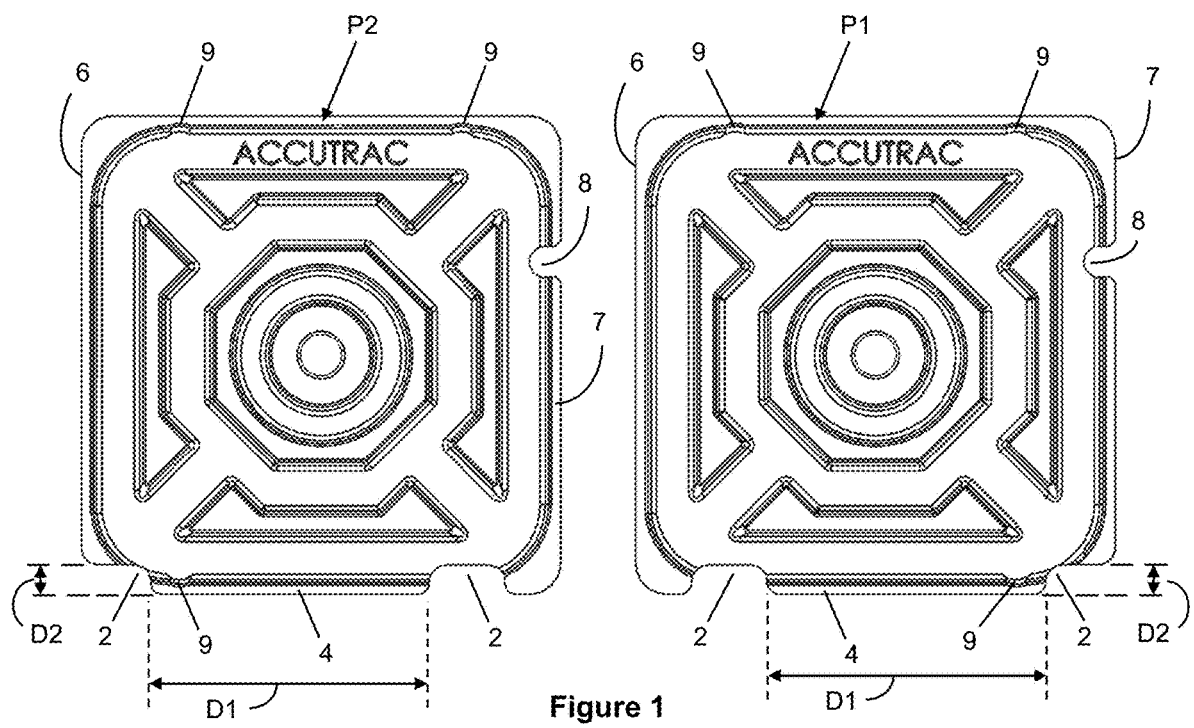
FIG. 1 is a top plan view of two differently configured plates for use with the disclosed plate advancement mechanism.

According to aspects of the disclosure, the disclosed embodiments of a plate advancement mechanism are configured to be used with a stack of plates comprising at least two different configurations of individual plates P1 and P2 that are arranged in an alternating pattern to form the stack. FIG. 1 illustrates exemplary embodiments of differently configured plates P1 and P2 compatible with the disclosed plate advancement mechanism. The plates P1, P2 are identical except for the location of indexing notches 2 along one edge of the plates. The edge of the plates including the one or more indexing notches will be referred to as the "indexing edge" of the plates. The disclosed plates P1, P2, are substantially square, with rounded corners and are stamped with embossed raised features to enhance the rigidity of the plates when used as part of a roofing system. Each plate also defines a centrally located fastener-receiving opening. It should be noted that the disclosed plate advancement mechanism is compatible with plates of other configurations. FIG. 1 illustrates the plates P1, P2 from above, showing the top of the plates. Plate P1 includes two indexing notches 2 interrupting an indexing edge 4 of the plate. The indexing edge 4 of the plates P1, P2 is perpendicular to a rear or trailing edge 6 of the plates P1, P2. A leading edge 7 of the plate is opposite the trailing edge 6 of the plate, with the terms "leading" and "trailing" referring to the direction in which the plates are moved from the stack to a plate releasing location by the disclosed plate advancement mechanism.

Figure 2:
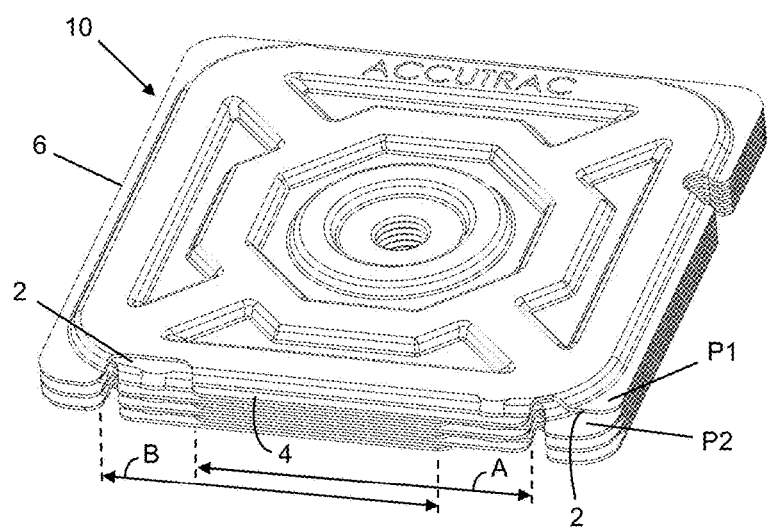
FIG. 2 is a perspective view of a stack of plates where the differently configured plates of FIG. 1 are alternated in the stack.

The notches 2 in plate P1 are spaced apart from each other along the indexing edge 4 of the plate, with one indexing notch 2 interrupting the leading corner of the plate. Both indexing notches interrupt the periphery of the plate P1. The notches in plate P2 are spaced apart from each other, with one indexing notch 2 interrupting the trailing corner of the plate. The notches 2 in plate P1 are space apart from each other a distance D1 substantially equal to the spacing D1 between the notches 2 in plate P2. The notches 2 of both plates P1, P2 penetrate a substantially equal distance D2 into the plate. The illustrated plates P1, P2, illustrate another notch 8 in the leading edge 7 that is not relevant to the disclosed plate advancement mechanism. The plates P1, P2 also include embossments 9 that prevent the plates from nesting too closely and serve to maintain a minimum separation between the plates when stacked. FIG. 2 illustrates a stack 10 of plates assembled by alternating plate P1 with plate P2. The indexing notches 2 of the P1 plates are at position A and the indexing notches 2 of the P2 plates are at position B.

FIGS. 3-7 illustrate a first embodiment of a plate advancement mechanism 20 incorporated into a roofing tool 100. The roofing tool 100 may incorporate a fastener feeding mechanism (not shown) configured to feed elongated fasteners into a position aligned with a fastener receiving opening in the center of each roofing plate. The roofing tool 100 includes at least one telescoping member 14 that is spring biased toward an extended position, where an operator exerts downward force against the spring bias to compress the telescoping member 14 from the extended position to a compressed position during operation of the roofing tool 100. The downward movement of the telescoping member 14 generally coincides with driving of an elongated fastener through a plate P1, P2, while upward movement of the telescoping member 14 generally coincides with advancing a plate P1, P2 from the stack to a plate releasing position separated from the stack and aligned with the shaft and bit of a screw gun or similar driver (not shown). The roofing tool 100 incorporates linkages between the telescoping member 14, the screw feeding device (not shown) and the plate advancement mechanism 20 to translate axial movement of the telescoping member 14 into coordinated rotational and/or linear forces that are applied to components of the screw feed device and the plate advancement mechanism 20.

Figure 19:
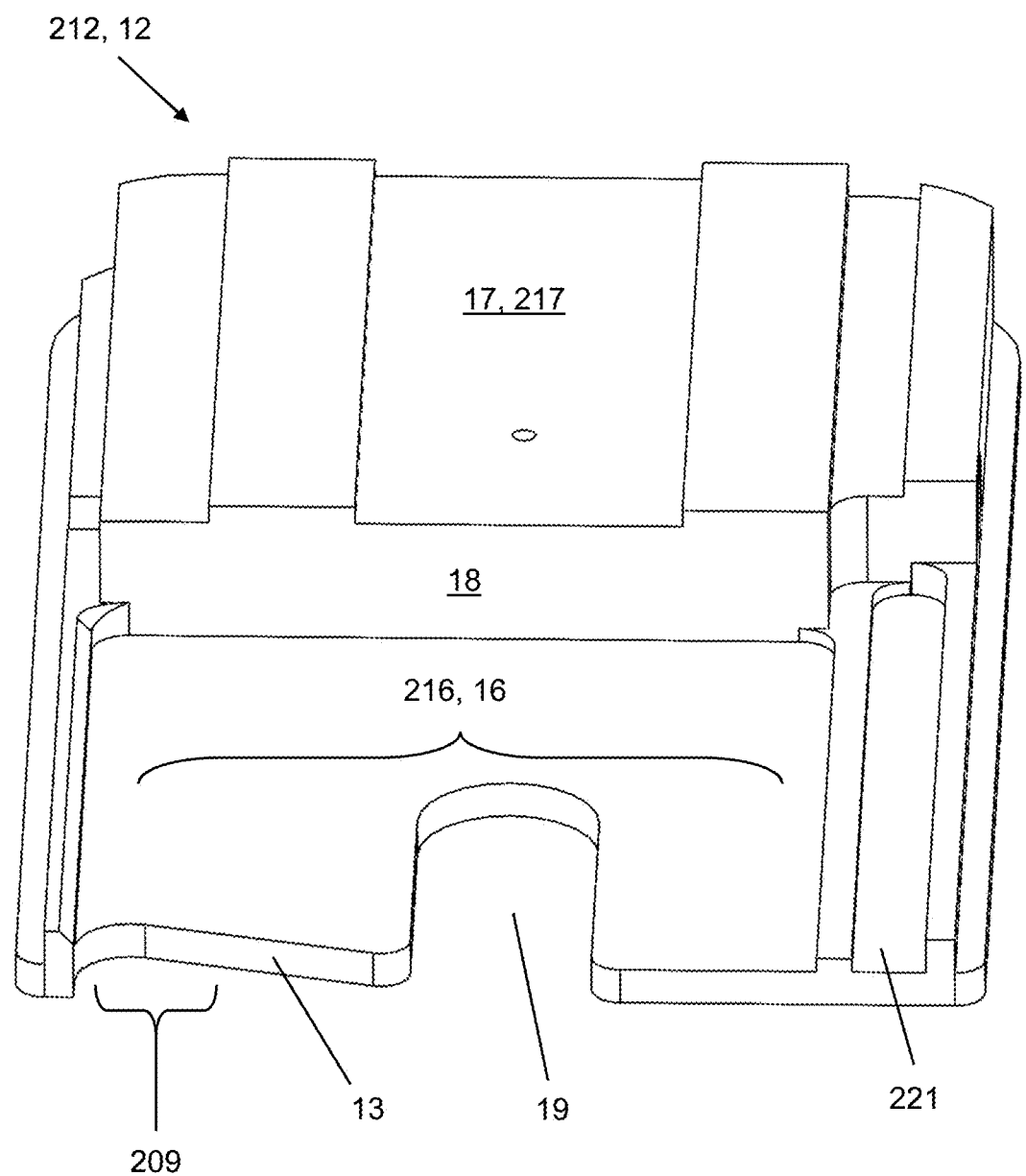
FIG. 19 is a rear perspective view of a shuttle compatible with the late advancement mechanism incorporated into the tool of FIGS. 8-10.

The body 110 of the roofing tool 100 defines a container 112 for receiving a stack 10 of roofing plates P1, P2. The plate advancement mechanism 10 includes a shuttle 12 guided in the body 110 of the roofing tool 100 for reciprocal linear movement between a feed position beneath a stack 10 of plates P1, P2 and a plate releasing position displaced from the stack. As best seen in FIG. 19, the shuttle 12 defines a recessed plate receptacle 16 and includes an upstanding rear wall 18 or protrusions that define a rear limit of the receptacle 16 configured to engage a trailing edge 6 of a plate P1, P2 to push the plate from a feed position at the bottom of the stack 10 to the plate releasing position. The shuttle 12 also includes a raised platform 17 separated from the receptacle 16 by the rear wall 18. According to aspects of the disclosure, either the receptacle 16 or the raised platform 17 is beneath the stack 10 of plates P1, P2 during movement of the shuttle 12 between the feed position and the plate releasing position. As will be discussed in greater detail below, plates are released from the stack onto either the platform 17 or onto the receptacle 16. The shuttle 12 also defines an elongated central opening 19 which allows an elongated fastener to be driven through the opening in the center of the plates P1, P2 while allowing the shuttle 12 to move from the plate releasing position back to the feed position.

Figure 6:
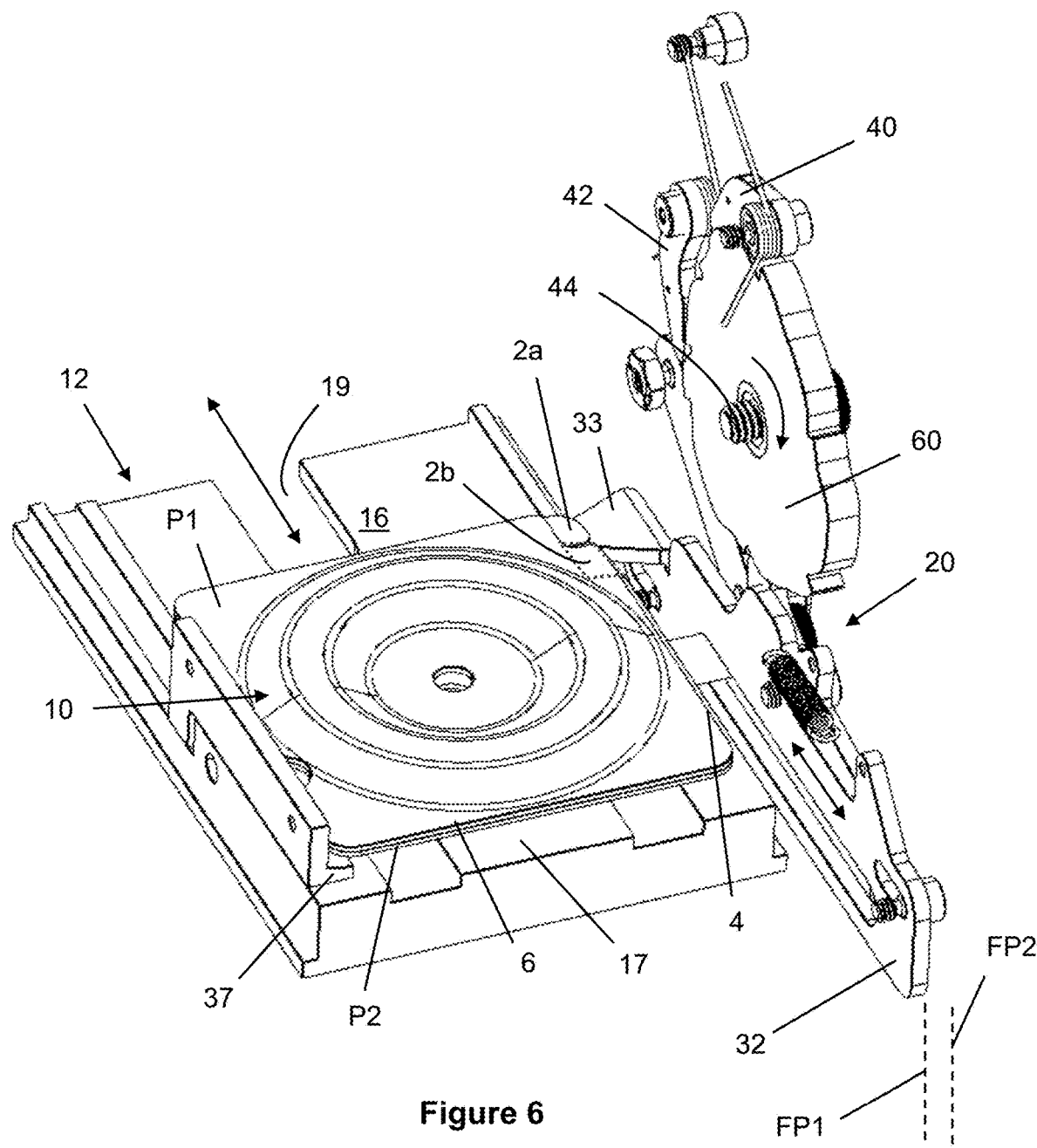
FIG. 6 is a rear perspective view of the plate advancement mechanism of FIG. 5.

The plate advancement mechanism 20 is configured to be used with a stack of two differently configured plates P1 and P2. The plates P1 and P2 are preferably identical except for the position of at least one feed notch along one side edge of the plate. In the case of the plate advancement mechanism 20 illustrated in FIGS. 3-7, each plate P1, P2 includes only a single indexing notch 2a, 2b, respectively. As shown in FIG. 6, plate P1 (the top plate) has an indexing notch 2a located at one corner of the plate, while plate P2 (the bottom plate) has an indexing notch 2b closer to the center of the indexing edge 4 of the plate. The stack 10 is assembled by alternating P1 plates with P2 plates so that every other plate has a feed notch 2a, 2b in an alternating position. Identical plates in succession may occur due to operator error in loading plates into a roofing machine incorporating an disclosed embodiments of a plate advancement mechanism. If a stack of plates 10 includes two or three identical plates in succession, the disclosed plate advancement mechanisms will advance up to three plates on top of each other without jamming. The indexing edge 4 of the plates P1, P2 which include the index notch 2a, 2b is perpendicular to the trailing edge 6 of the plates P1, P2. The plate advancement mechanism 20 includes an indexer 32 with a feed tab 33 that reciprocates between a first feed position FP1 aligned with the feed notch 2a of plate P1 and a second feed position FP2 aligned with the feed notch 2b of plate P2. The shuttle 12 reciprocates between a feed position where the receptacle 16 is beneath the stack 10 and a plate releasing position where the raised platform 17 is beneath the stack 10 and a plate is in the receptacle 16 and aligned with a driver shaft and bit (not shown). When the shuttle 12 is in the feed position beneath the stack 10 and the feed tab 33 on the indexer 32 is aligned with the feed notch of the bottom plate in the stack 10, the indexing edge of the bottom plate is released from the stack 10 and falls by force of gravity until the released side edge rests on a floor of the receptacle 16 defined by the shuttle 12. When the shuttle 12 is in the plate releasing position shown in FIGS. 5 and 6 and the feed tab on the indexer 32 is aligned with the feed notch of the bottom plate in the stack 10, the indexing edge 4 of the bottom plate is released from the stack 10 and falls onto the raised platform 17 of the shuttle 12. When the shuttle 12 returns to the feed position, the released indexing edge 4 of the bottom plate slides along the raised platform 17 until it falls onto the floor of the receptacle 16.

According to aspects of the disclosure, the side edge of the plates P1, P2 opposite the indexing edge 4 is supported by a rail 37 and does not immediately fall onto the shuttle 12. The feed notch 2a, 2b in the plate above the bottom plate (the next plate in the stack 10) is not aligned with the feed tab 33 on the indexer 32 and remains supported at both side edges. The alternating feed notches 2a, 2b and reciprocating indexer 32 prevent double feeding of plates by releasing only one plate at a time from the stack 10.

Figure 10:
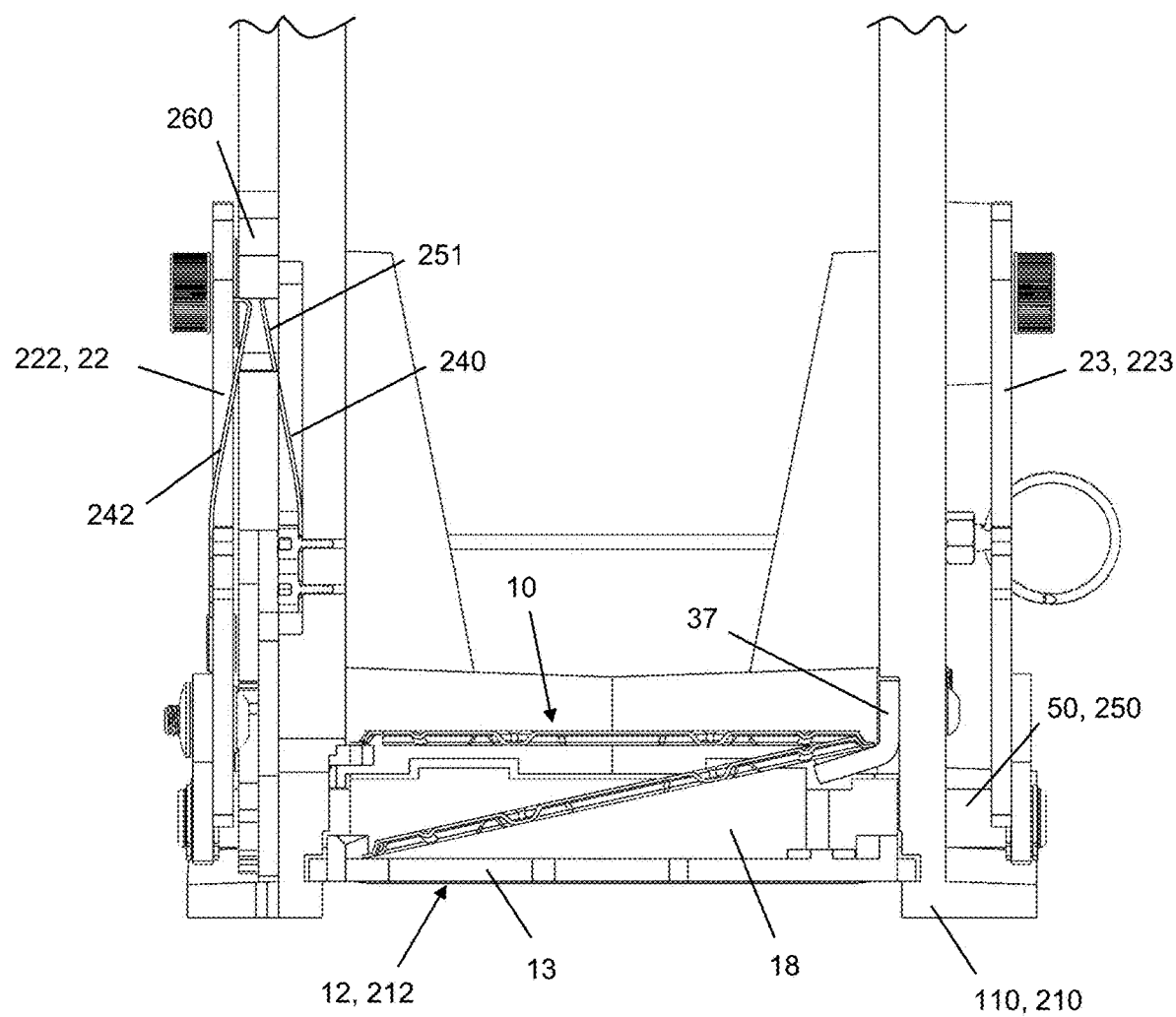
FIG. 10 is a partial rear sectional view through the tool of FIGS. 8 and 9.

FIG. 10 illustrates a plate P1, P2 with the indexing edge 4 released from the stack 10 and the shuttle 12 in the feed position with the receptacle 16 beneath the stack 10. With the released indexing edge 4 of the bottom plate resting on the floor of the receptacle 16 and the other side edge supported by the rail 37, the bottom plate in the stack 10 is in an angled position with most of the trailing edge 6 of the bottom plate overlapping with an upstanding rear wall 18 of the shuttle receptacle 16. With the bottom plate in this released position, advancement of the shuttle 12 toward the plate releasing position brings the upstanding rear wall 18 of the shuttle receptacle 16 into contact with the angled rear edge 6 of the bottom plate, pushing the bottom plate from beneath the stack 10. As the shuttle 12 moves toward the plate releasing position, the supported edge of the plate slides along and then off the end of the rail 37 so that the plate is now flat on the floor of the receptacle 16. It will be observed that no portion of the upstanding rear wall 18 of the shuttle receptacle 16 overlaps with any part of the next plate in the stack, which is supported at the indexing edge 4 by the feed tab 33 and on the opposite edge by the rail 37.

Figure 20:
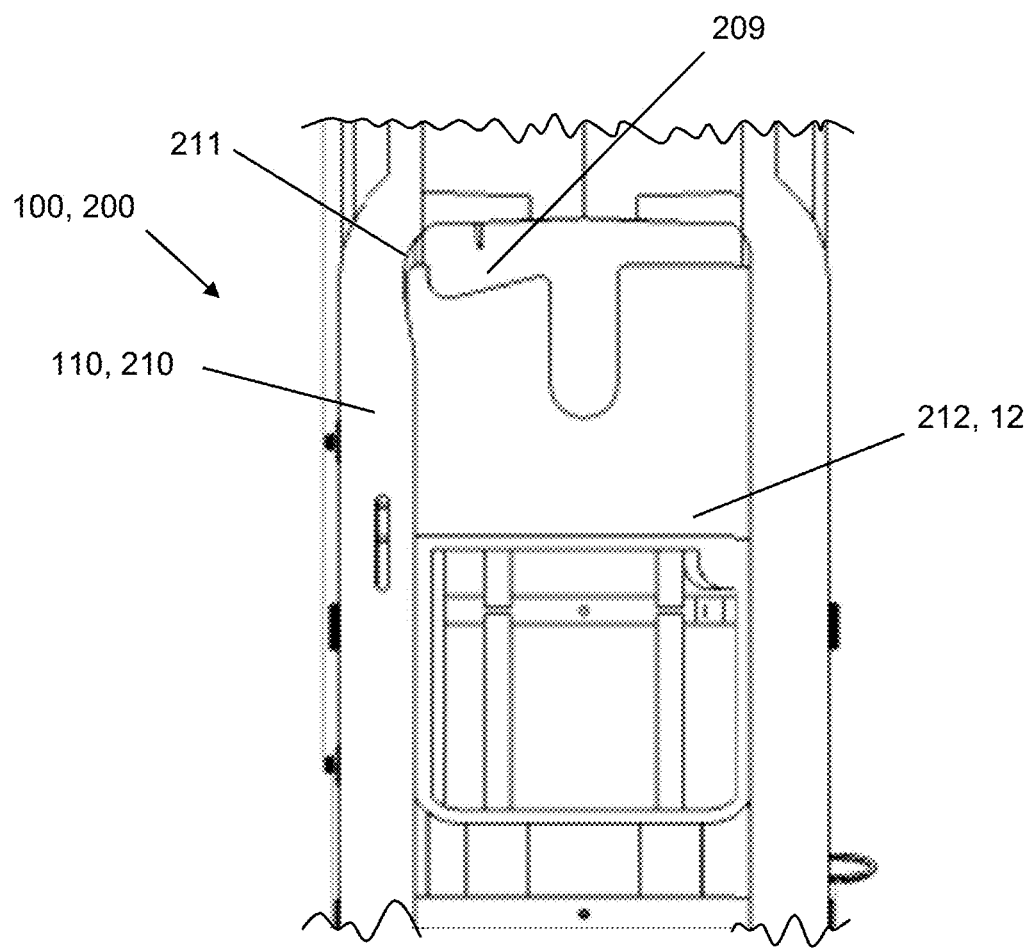
FIG. 20 is a partial bottom plan view of the tool of FIGS. 8-10.

With one edge of the bottom plate released from the stack 10 and the other edge still engaged with the stack, unbalanced forces may be exerted on the plate by the shuttle 12 as the plate is separated from the stack 10. These unbalanced forces may cause the plate to rotate slightly, with the released indexing edge 4 of the plate advancing ahead of the supported edge. As shown in FIGS. 19 and 20, the shape of the opening in the bottom of the body 110, 210 of the roofing tool 100 and the shape of the leading edge 13 of the shuttle 12, 212 may be asymmetrical to accommodate a slightly rotated position of the plates P1, P2 during release of the plate from the shuttle 12, 212.

Figure 3:
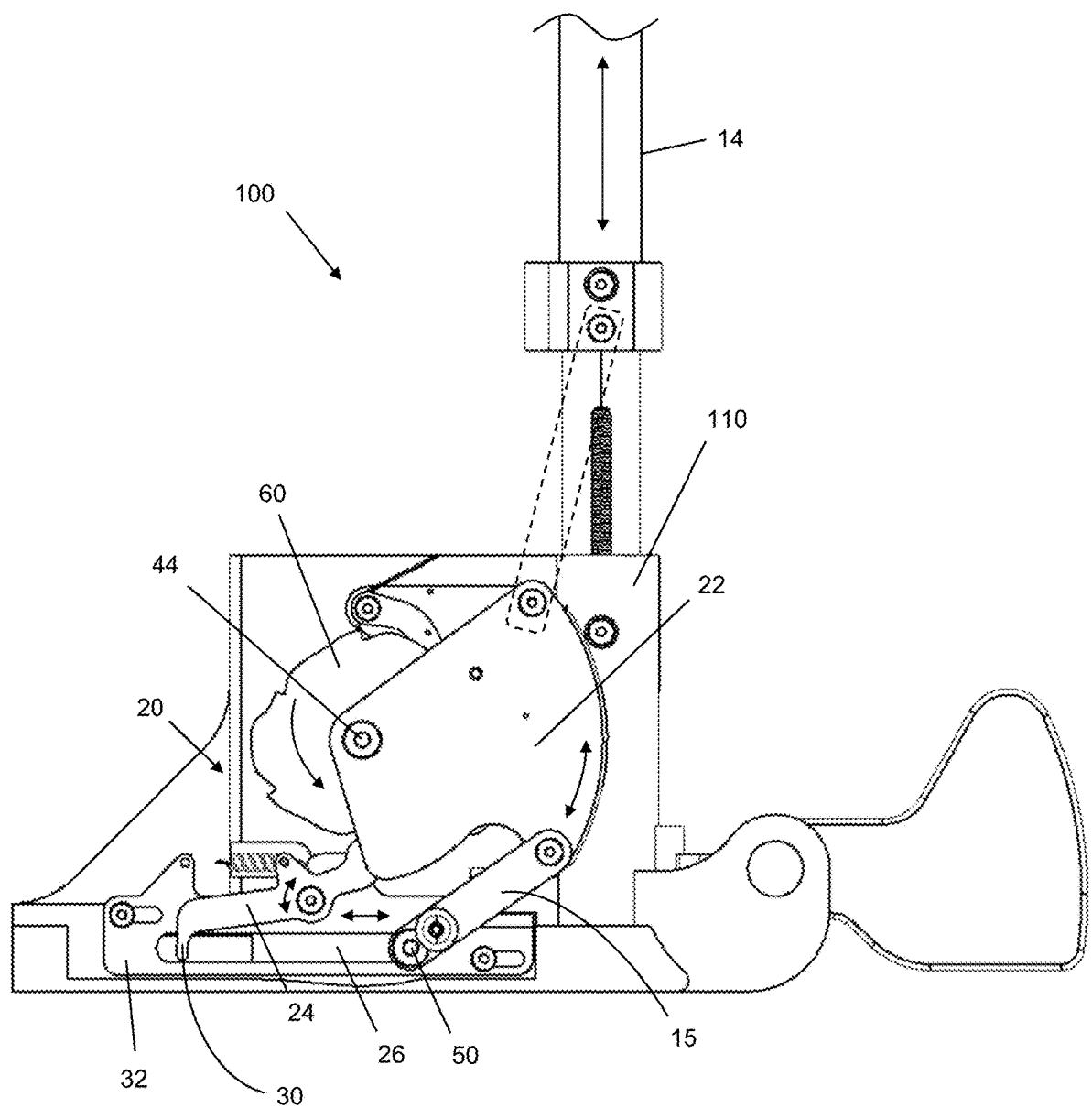
FIG. 3 is a partial side elevation view of a roofing tool incorporating a first embodiment of the disclosed plate advancement mechanism.
Figure 7:
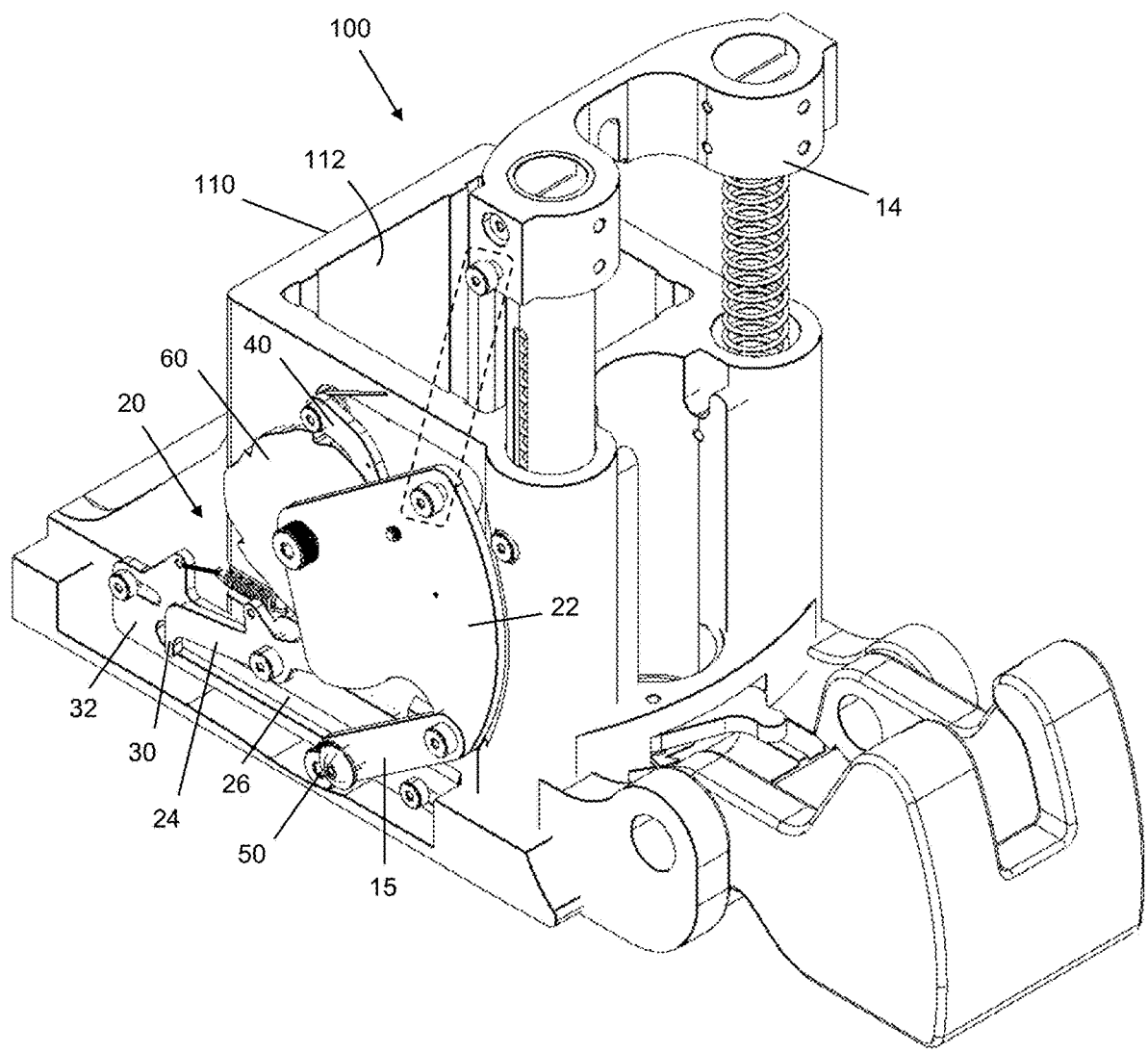
FIG. 7 is a partial rear perspective view of the roofing tool of FIG. 3.

With reference to FIGS. 3 and 7, the plate advancement mechanism 20 includes a bell crank 22 coupled to the telescoping member 14 to translate axial motion of the telescoping member 14 into rotational and linear forces that are applied to different components. In the disclosed embodiments, the bell crank 22 pivots about an axis of rotation 44 between a lowered position when the telescoping member is compressed and a raised position when the telescoping member is extended (as shown in FIG. 3). The axis of rotation 44 of the bell crank 22 is shared by a cam 60. The bell crank 22 supports a first pawl 42 arranged to engage teeth 48 on an outside surface of the cam 60 when the bell crank 22 is pivoting upward (counterclockwise in FIGS. 3 and 4) to rotate the cam 60 counterclockwise. A second pawl 40 supported by the body 110 of the roofing tool 100 engages the teeth 48 of the cam 60 to prevent counterrotation of the cam 60 when the bell crank 22 is moving downward (clockwise), so that the cam 60 rotates only in one direction. Each movement of the cam 60 rotates the cam approximately 60°.

Figure 21:
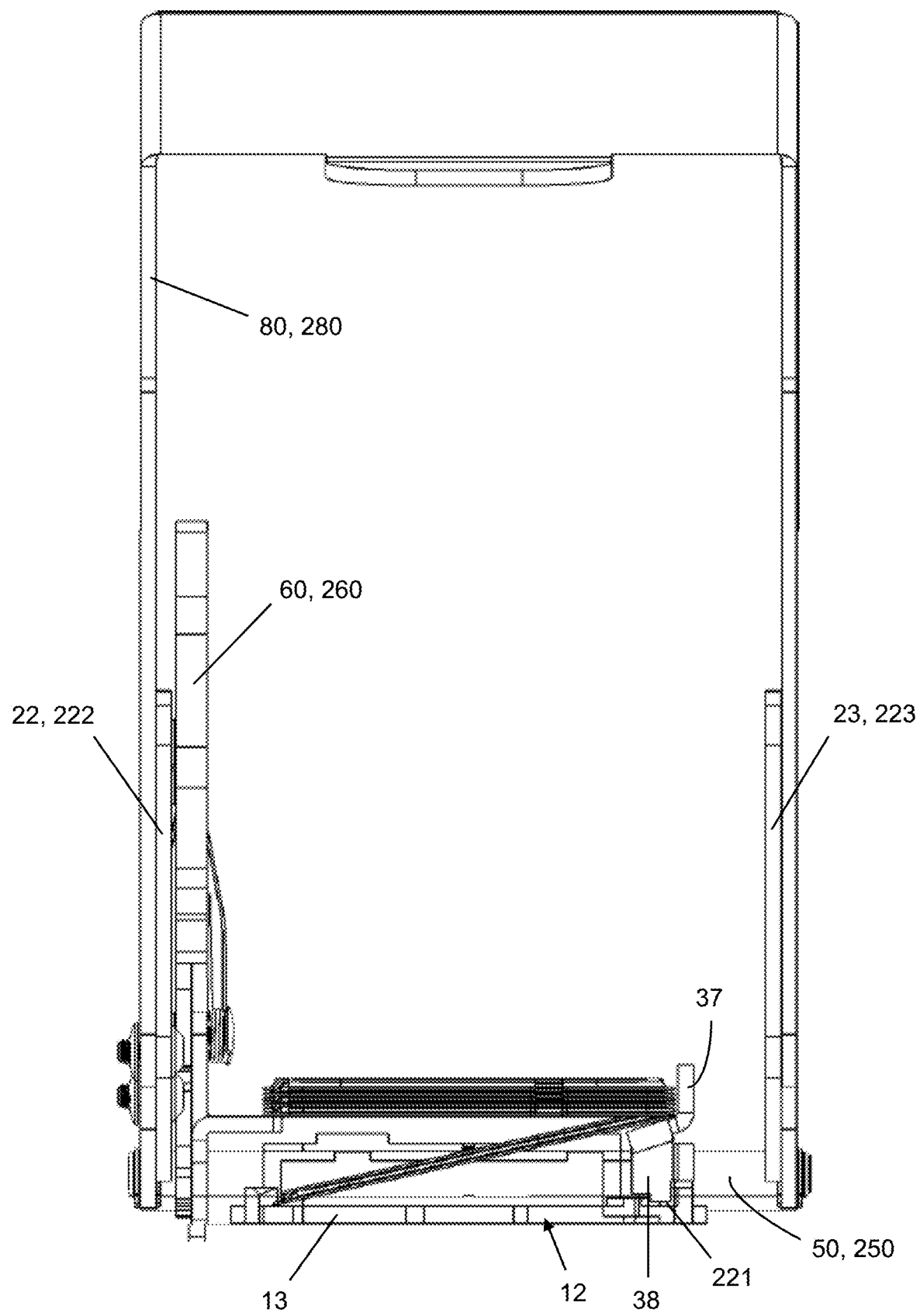
FIG. 21 is a rear elevation view of select components of the plate advancement mechanism incorporated into the tool of FIGS. 8-10.

An arm 15 connects the bell crank 22 to a cross pin 50 that extends through the body 110 of the roofing tool 100 and the shuttle 12 to move the shuttle 12 between the feed position and the plate releasing position as the telescoping member 14 moves from the compressed position toward the extended position. When the roofing tool 100 is at rest, the telescoping member 14 is in its extended position, the bell crank 22 is in the raised position and the shuttle 12 is in the plate releasing position with the shuttle receptacle 16 (and a plate P1, P2 on the shuttle 12) aligned with the driver bit of a driver (not shown). As shown in FIGS. 10 and 21, in some embodiments of a roofing tool, the bell crank 22 is connected to the telescoping member 14 by a yoke 80 that spans the body 110 of the roofing tool 100 and engages the bell crank 22 and an identical bell crank 23 on the opposite side of the body 110 of the roofing tool 100. The cross pin 50 connects the bell cranks 22, 23 to each other and to the shuttle 12 so that forces applied to the shuttle 12 are balanced and the shuttle 12 is guided within the body 110 of the roofing tool 100 without binding. As shown in FIG. 10, the body 110 of the roofing tool 100 and the shuttle 12 include features that extend parallel to a direction of shuttle 12 movement to guide movement of the shuttle 12 within the body 110 of the roofing tool 100. The balanced application of forces to the shuttle 12 via the yoke 80 and bell cranks 22, 23 along with the cooperating features of the body 110 and shuttle 12 ensure smooth movement of the shuttle 12 without binding.

Figure 4:
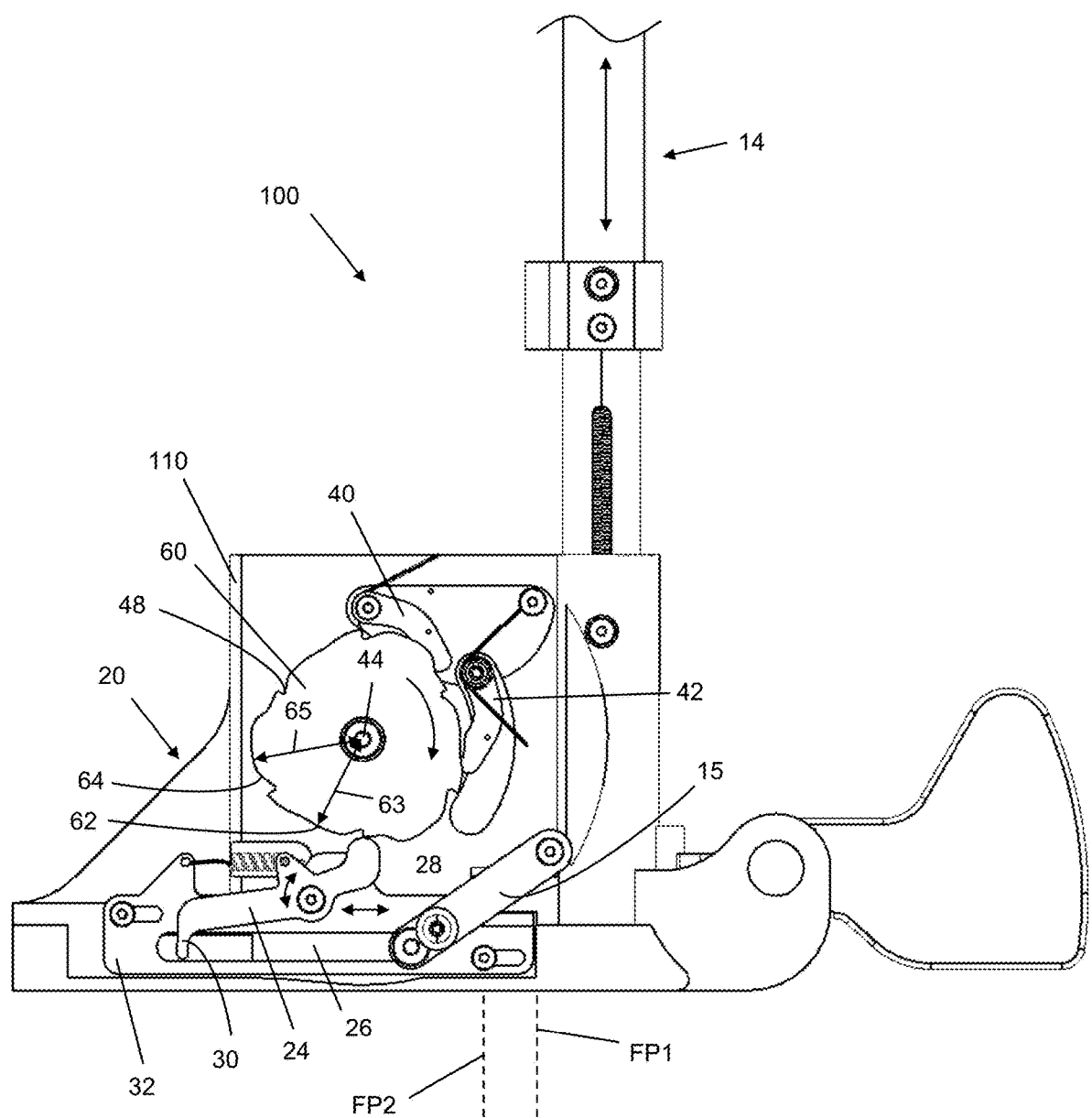
FIG. 4 is a side elevation view of the tool of FIG. 3 with the bell crank removed, showing other components of the first embodiment of the plate advancement mechanism.
Figure 5:
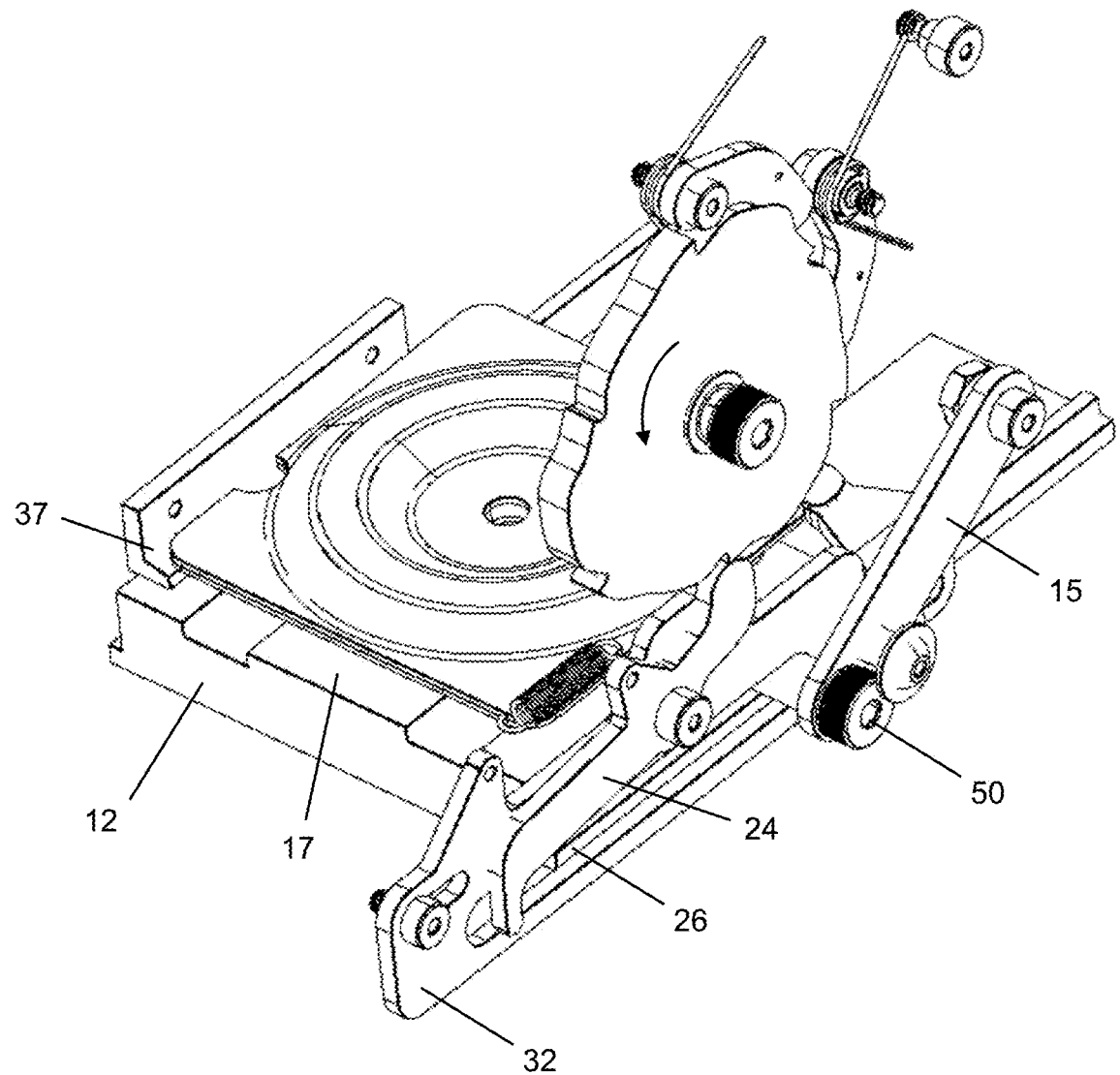
FIG. 5 is a front perspective view of the first embodiment of the plate advancement mechanism incorporated into the tool of FIGS. 3 and 4 with select elements removed.

Movement of the indexer 32 between the first feed position FP1 and second feed position FP2 is controlled by a feed latch 24 carried by the indexer 32 in combination with movement of the cross pin 50. As shown in FIGS. 3 and 4, one embodiment of the indexer 32 includes a slot 26 aligned with a slot defined by the body 110 of the roofing tool 100 in which the cross pin 50 is guided during reciprocal movement. At each longitudinal end of the slot 26, the indexer 32 extends across the path of travel of the cross pin 50. The cross pin 50 always moves the same distance to move the shuttle 12 from the plate releasing position to the feed position during compression of the telescoping member 14 and back to the plate releasing position during extension of the telescoping member 14. The slot 26 in the indexer 32 has a length substantially equal to the distance moved by the cross pin 50. The feed latch 24 is supported on the indexer 32 to pivot between a latched position where a front end 30 of the feed latch 24 extends across the path of travel of the cross pin 50 and a displaced position where the front end 30 of the feed latch 24 does not extend across the path of travel of the cross pin 50. In the latched position shown in FIG. 3, the front end 30 of the feed latch 24 effectively shortens the length of the slot 26 in the indexer 32. When the feed latch 24 is in the latched position shown in FIG. 3, movement of the cross pin 50 and shuttle 12 to the feed position causes the cross pin 50 to hit the front end 30 of the feed latch 24 and shift the indexer 32 from the first feed position FP1 to the second feed position FP2. The indexer 32 is not biased toward either position and so remains in position FP2 until it is moved by the cross pin 50 when the cross pin 50 returns to a position corresponding to the shuttle 12 in the plate releasing position shown in FIGS. 3 and 4. When the cross pin 50 returns to the opposite end of the slot 26, it shifts the indexer 32 from the second feed position FP2 back to the first feed position FP1.

Each movement of the indexer 32 from the first feed position FP1 to the second feed position FP2 happens when the telescoping member 14 is compressed and the shuttle 12 is moved to the feed position where the receptacle 16 is beneath the stack 10. When the indexer 32 moves to the second feed position FP2, the feed tab 33 on the indexer 32 is aligned with the feed notch 2b of plate P2 and the indexing edge 4 of the bottom plate in the stack is released, allowing the indexing edge 4 to fall onto the floor of the shuttle receptacle 16 as shown in FIG. 10. Each movement of the indexer 32 from the second feed position FP2 to the first feed position FP1 happens when the telescoping member 14 is extending and the shuttle 12 is moving from the feed position to the plate releasing position where the raised platform 17 is beneath the stack 10 as shown in FIG. 6. When the indexer 32 moves to the first feed position FP1, the feed tab 33 is aligned with the feed notch 2a of plate P1 and the indexing edge 4 of the bottom plate in the stack is released, allowing the indexing edge to fall onto the raised platform 17 where it remains until the shuttle is moved back to the feed position by compression of the telescoping member 14. During this part of the feed cycle, the cam 60 has rotated to bring lobe 64 to bear on the actuation end 28 of the feed latch 24, pivoting the front end 30 of the feed latch 24 out of the path of travel of the cross pin 50 so the indexer remains in the first feed position FP1 and another plate is not released. The indexing edge of previously released plate P1 falls to the floor of shuttle receptacle 16 and is pushed from under the stack by upstanding rear wall 18 of the receptacle bearing on the trailing edge 6 of the plate P1.

The indexer 32 moves to the second feed position FP2 on alternating cycles of cross pin 50 and shuttle 12 movement between the feed position and the plate releasing position. The feed latch 24 includes an actuation end 28 opposite the front end 30. With reference to FIG. 4, the feed latch 24 is biased toward the latched position, which biases the actuation end 28 against the outside surface of the cam 60. In the plate feed device 20 of FIGS. 3-7, the outside surface of the cam 60 defines teeth 48 that engage the pawls 40, 42, and includes actuation lobes 62, 64 at different radial distances relative to axis 44. Cam lobe 62 has a smaller radial distance 63 from the axis 44 than the radial distance 65 of cam lobe 64. When the actuation end 28 of the feed latch 24 is against lobe 62, this puts the feed latch 24 in the latched position with the front end 30 in the path of travel of the cross pin 50. When the actuation end 28 of the feed latch 24 is against lobe 64, this moves the front end 30 out of the path of travel of the cross pin 50. Cam 60 includes six teeth 48 arranged between three lobes 62 alternating with three lobes 64. This pattern divides the circumference of the cam into alternating lobes 62, 64, separated by teeth 48, with rotation of the cam 60 approximately 60° during each upward movement of the bell crank 22 shifting the position of the feed latch 24.

Figure 8:
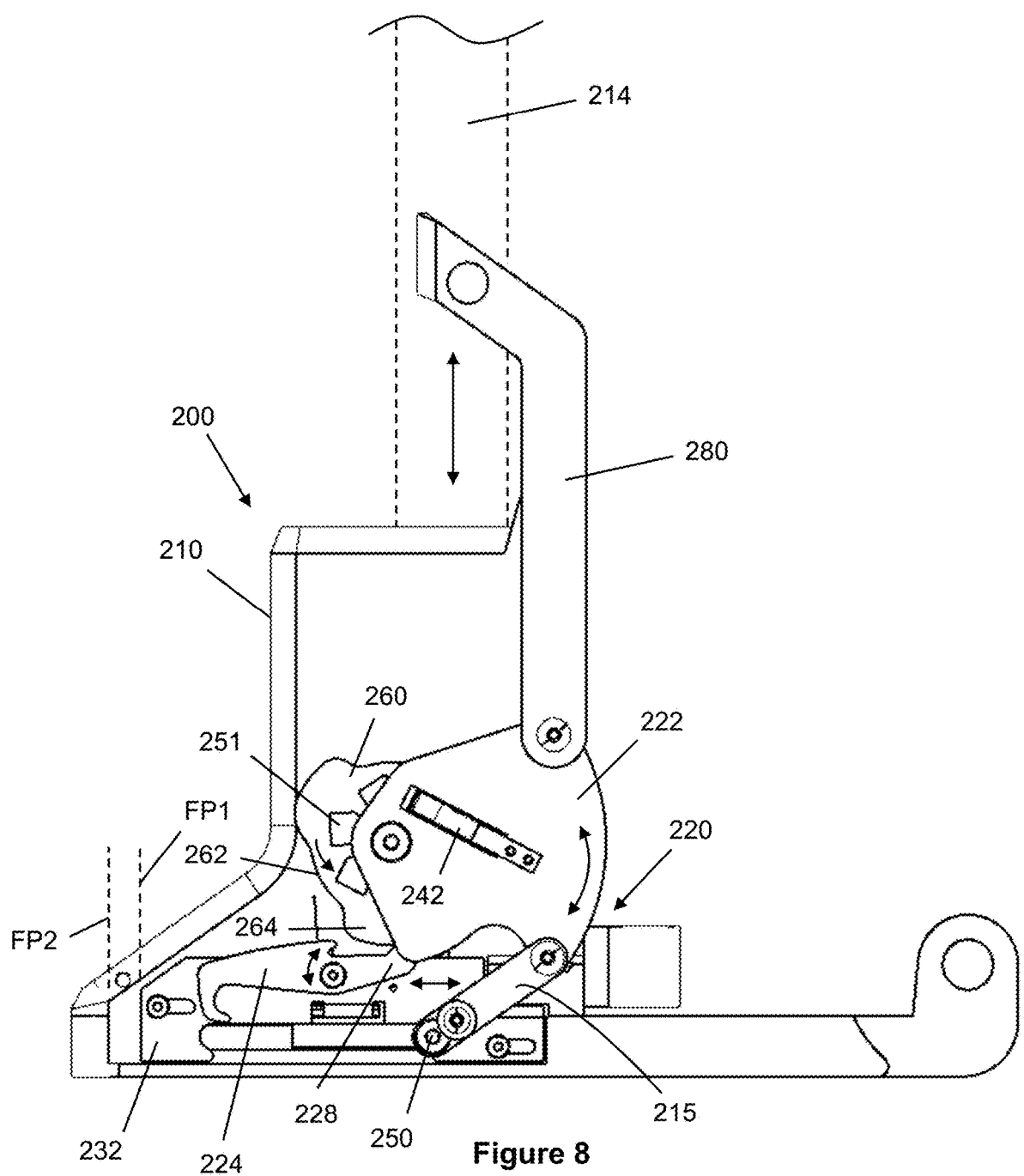
FIG. 8 is a partial side elevation view of a roofing tool incorporating a second embodiment of the disclosed plate advancement mechanism.
Figure 9:
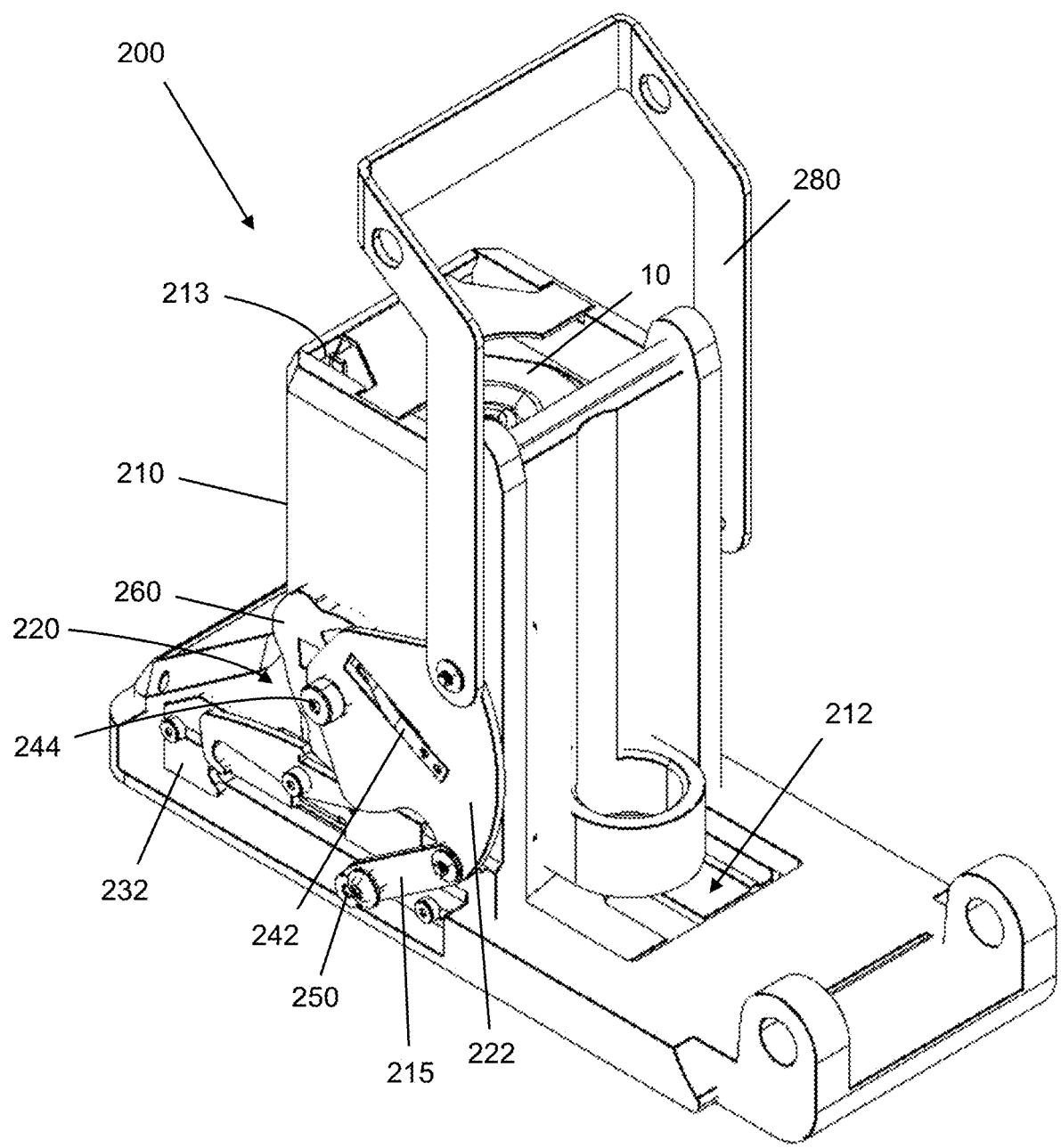
FIG. 9 is a rear perspective view of the tool of FIG. 8.

In another embodiment, shown in FIGS. 8-10, a roofing tool 200 incorporates an alternative embodiment of a plate advancement mechanism 220 that operates in substantially the same manner to the plate advancement mechanism 20 illustrated in FIGS. 3-7, i.e., by translating downward and upward movement of a telescoping member 214 into pivoting forward/rearward movement of a bell crank 222 to apply linear and rotational movement to the components of the plate advancement mechanism. In this embodiment of a plate advancement mechanism 220, the one-way (counter-clockwise only) rotation of the cam 260 is accomplished via a pair of spring arms, 240 and 242 that interact with slots 251 in the cam 260. As will be explained below, one spring arm 240 is mounted to the body 210 of the roofing tool 200 and engages the top edge of a slot 251 in the cam 260 to hold it in place during a downward pivoting movement of the bell crank 222, while the other spring arm 242 mounted to the bell crank 222 slides against the outside surface of the stationary cam 260. When the telescoping member 214 is compressed to its lowermost position with the bell crank 222 rotated clockwise and the arm 215 extended forward, spring arm 242 engages the top edge of a cam slot 251 such that a return stroke rotates the cam 260 counterclockwise approximately 60° to shift contact of the actuation end 228 of the feed latch 224 from one cam lobe 262 to the next cam lobe 264. The bell crank 222 and cam 260 share an axis of rotation 244. The bell cranks 222, 223 are coupled to a cross pin 250 by arm 215 to translate pivoting movement of the bell cranks 222, 223 into linear movement of the shuttle 212 between the feed position and the plate releasing position. The body 210 of the roofing tool 200 defines a container 213 for a stack 10 of plates P1, P2. The plates P1, P2 employed with this embodiment of the plate advancement mechanism 220 have two indexing notches arranged along an indexing edge 4 of the plate as shown and described in conjunction with FIGS. 1 and 2. Accordingly, the indexer 232 includes two indexing tabs 233a and 233b arranged to support the indexing edge 4 of a plate in the stack 10, or to release the indexing edge 4 of the bottom plate in the stack 10 when aligned with the indexing notches 2.

FIGS. 11-18 depict a progression of key operational steps of this embodiment of the plate advancement mechanism 220. As can be seen, numerous elements of the roofing tool 200 are removed or represented in phantom for clarity.

Figure 11:
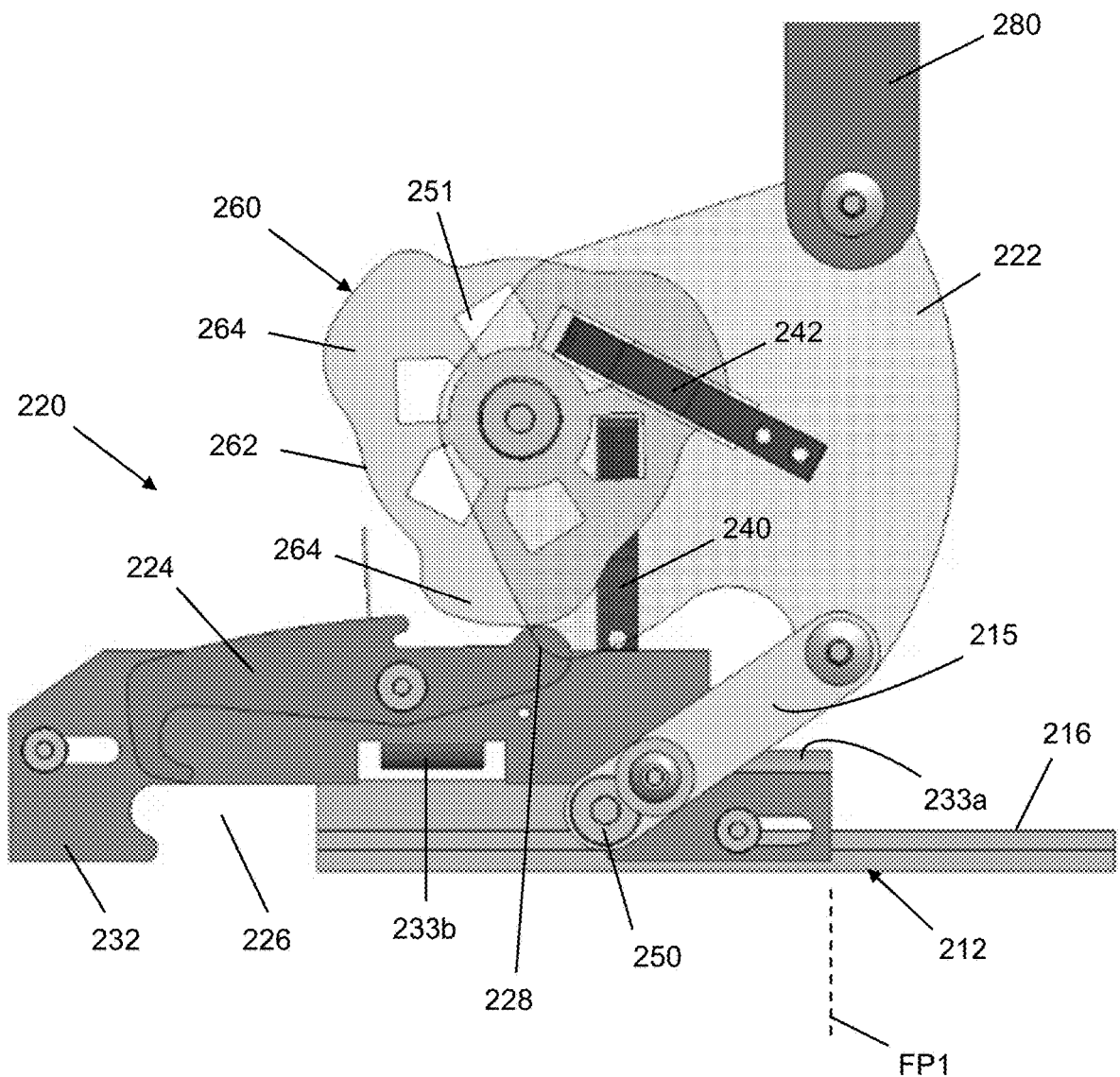
FIGS. 11 through 18 depict an exemplary progression of steps for advancing a plate using the plate advancement mechanism incorporated in the tool of FIGS. 8-10.

FIG. 11 represents an exemplary initial condition with a radially bulging lobe 264 of the cam 260 engaged with the actuation end 228 of the feed latch 224, forcing the feed latch 224 into the raised position out of the path of movement of the cross pin 250. In this first feed position FP1 of the indexer 232, the indexing edge of a plate of the first type P1 (with alignment notches 2 in the forward position) is released from the stack 10 and prepared to fall to the floor of the receptacle 216 when the shuttle 212 is moved to the feed position where the receptacle 216 is beneath the stack 10. A roofing plate P2 is positioned on the receptacle 216 in the plate releasing position beneath the main drive tube through which an elongate fastener will be driven. The full extent of the slot 226 is exposed. The telescoping member 214 is extended, the bell crank 222 is in its rotational rearward/upward raised position with the arm 215, cross pin 250 and attached shuttle in the plate releasing position.

Figure 12:
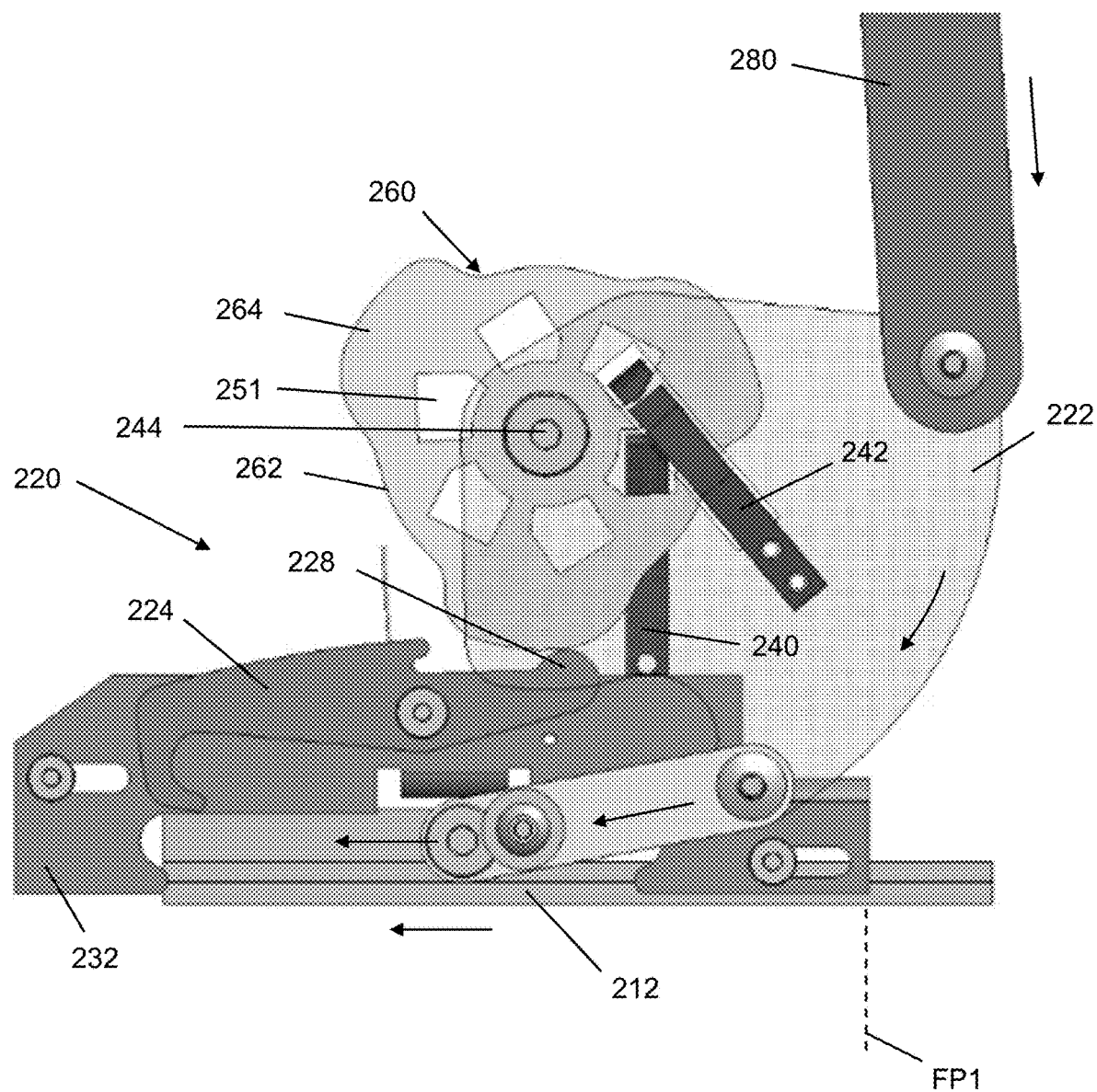

FIG. 12 represents the start of a downward compression of the telescoping member 214 from the initial position of FIG. 11. Downward compression of the telescoping member is delivered to the bell crank 222 by the yoke 280, pivoting the bell crank 222 clockwise about axis 244. Importantly, the configuration of the respective spring arms 240 and 242 is such that the terminal the fixed spring arm 240 engages within a slot 251 in the cam 260 from the rear and prevents the cam 260 from rotating clockwise with the bell crank 222. As shown, spring arm 242 carried by the bell crank 222 is configured to disengage from the cam slot 251 and travel with the bell crank 222 while sliding against the outside surface of the cam 260. As such, clockwise rotation of the cam 260 is prevented on a downward stroke of the telescoping member 214, clockwise pivot of the bell crank, arm 215, cross pin 250 and shuttle 212. As a result, the feed latch 224 is held in the raised position by the radially protruding cam lobe 264 acting on the actuation end 228 of the feed latch 224.

Figure 13:
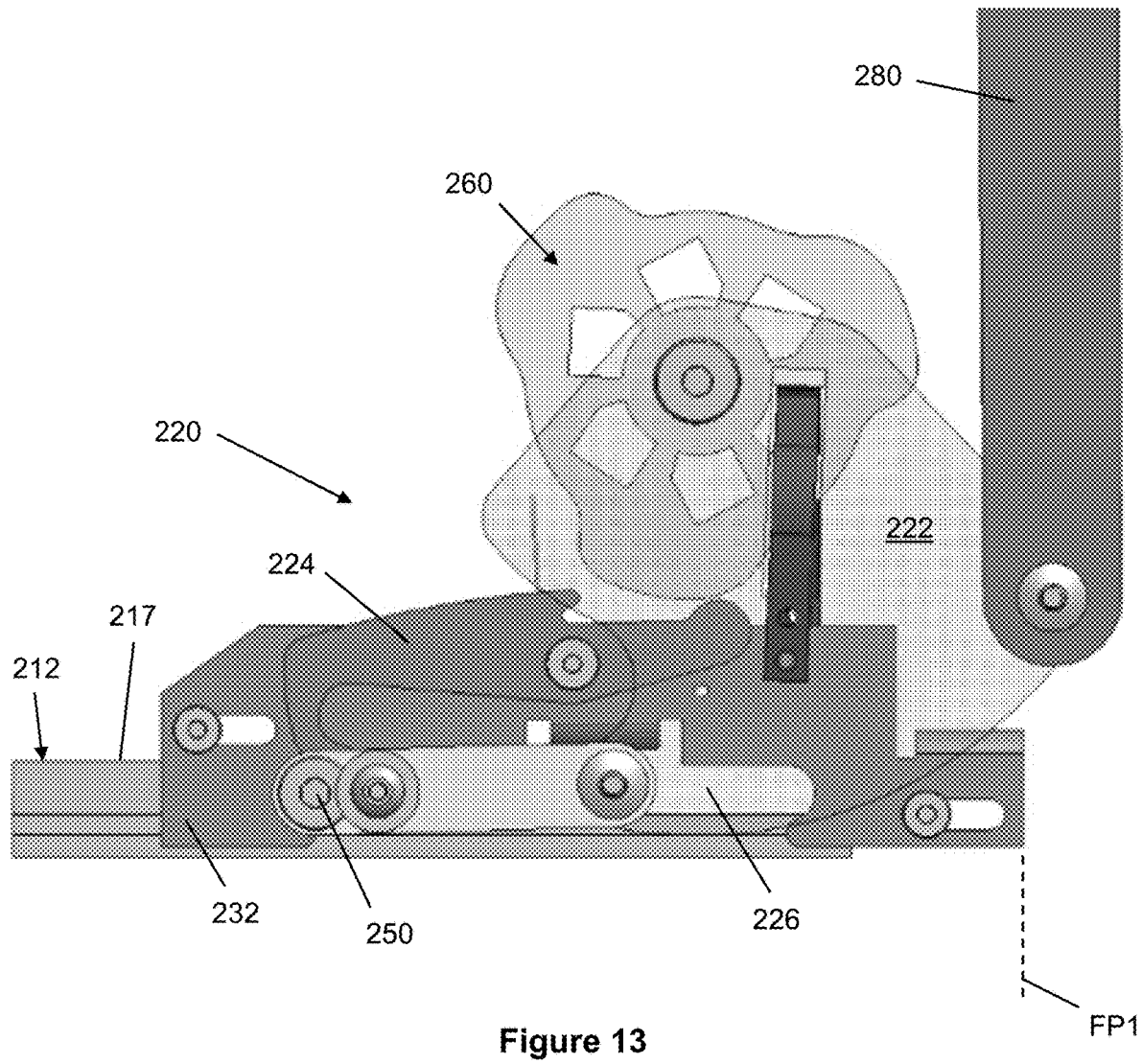

FIG. 13 shows the plate advancement mechanism 220 when the telescoping member 214 is fully compressed, with the cross pin 250 at the terminal end of the slot 226 and the shuttle 212 in the feed position with the receptacle 216 beneath the stack 210. The indexing edge of the P1 plate that had been resting on the raised platform 217 of the shuttle 212 can now fall onto the floor of the receptacle 216 of the shuttle 212. The P2 plate previously in the plate release position has been released from the shuttle 212 and secured to the structure by an elongate fastener. Note that the indexer 232 has not moved from the first feed position FP1, so another plate is not released from the stack. As depicted, in this position the of the spring 242 carried by the bell crank 222 engages the top edge of the next slot 251 in the cam 260.

Figure 14:
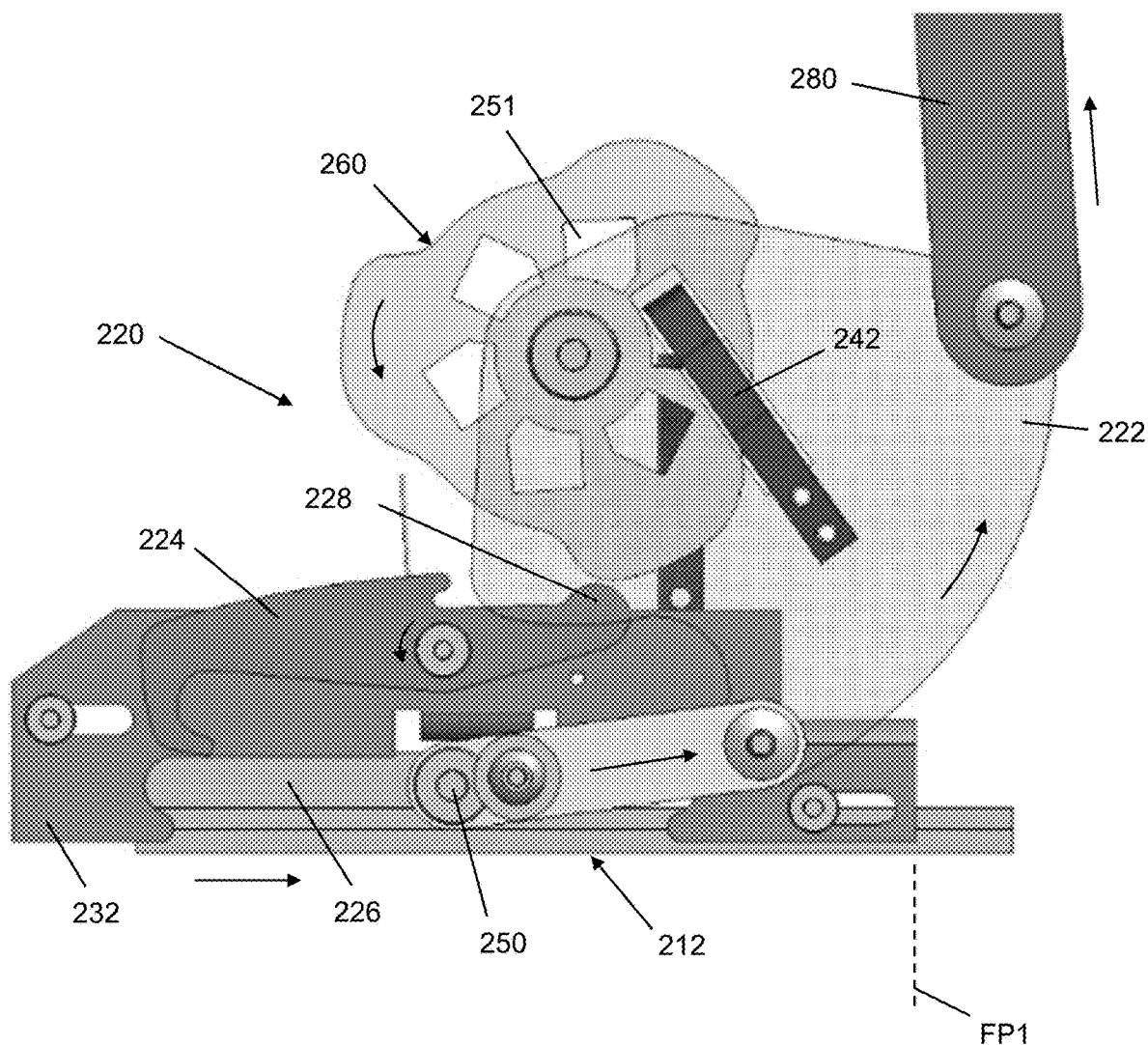

FIG. 14 illustrates movement of the plate advancement mechanism 220 as the telescoping member 214 is released and begins to extend. The yoke 280 pivots the bell crank 222 counterclockwise toward a raised position. As the bell crank rotates counterclockwise engagement of spring arm 242 carried by the bell crank 222 with the cam slot 251 rotates the cam 260 counterclockwise. Rotation of the cam 260 moves the radially protruding lobe 264 from the actuation end 228 of the feed latch 224, allowing the feed latch 224 to move to the latched position (via counterclockwise rotation), thereby shortening the longitudinal extent of the slot 226. The shuttle 212 moves toward the plate release position, carrying the P1 plate in the receptacle 216 with it, positioning the P1 plate beneath the main drive tube (not shown) for an elongate fastener to be driven through.

Figure 15:
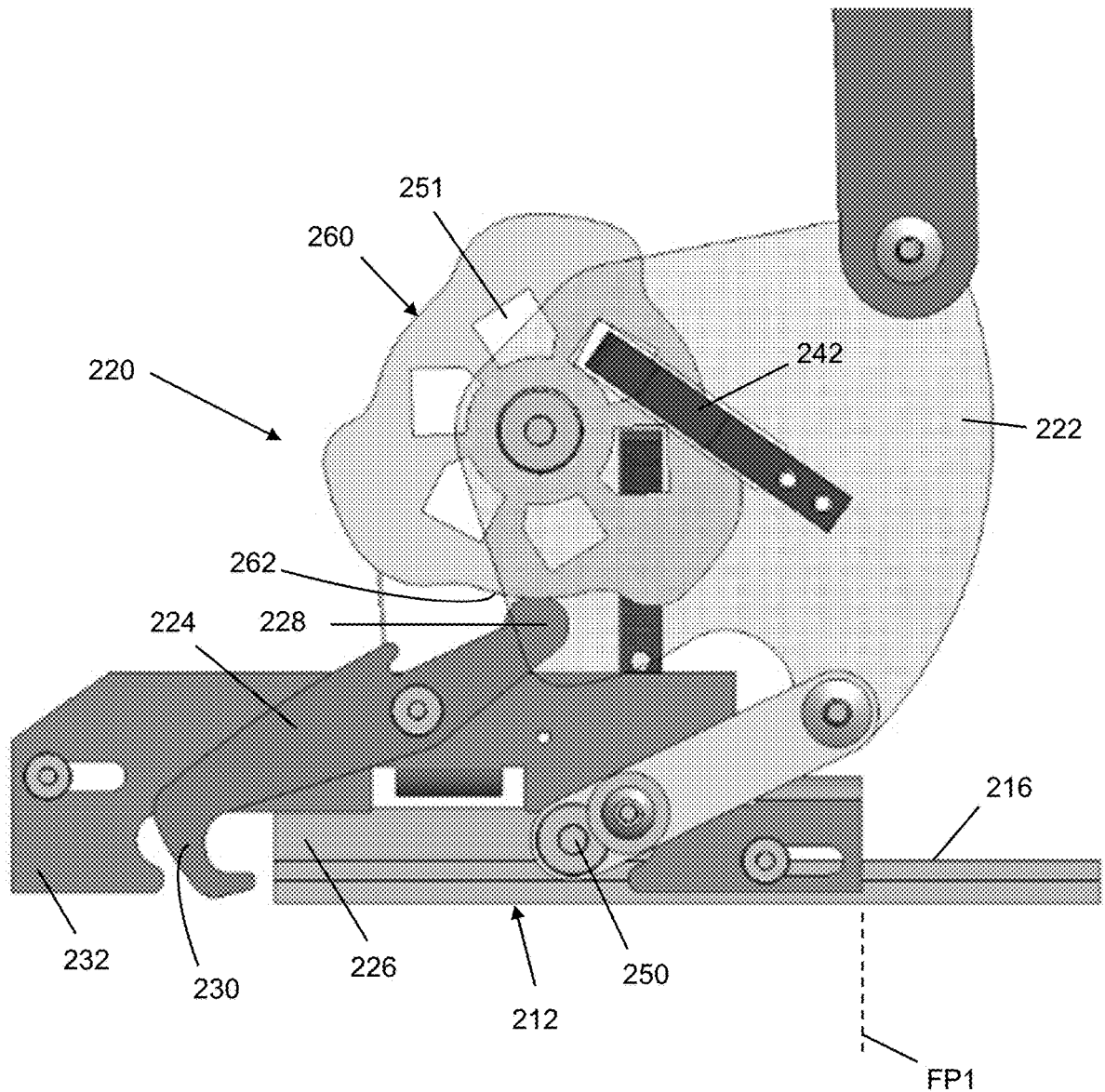

FIG. 15 depicts the position of the plate advancement mechanism 220 with the telescoping member 214 in the raised position again and the bell crank 222 in its raised position, with the feed latch 224 lowered so the front end 230 of the feed latch 224 extends across the path of travel of the cross pin 250, shortening the longitudinal extent of the slot 226. As shown, counterclockwise rotation of the cam 260 approximately 60° from the position in FIG. 13 aligns a radially recessed lobe 262 of the cam 260 with the actuation end 228 of the feed latch 224, which returns the feed latch to its latched position shortening the longitudinal extent of the slot 226.

Figure 16:
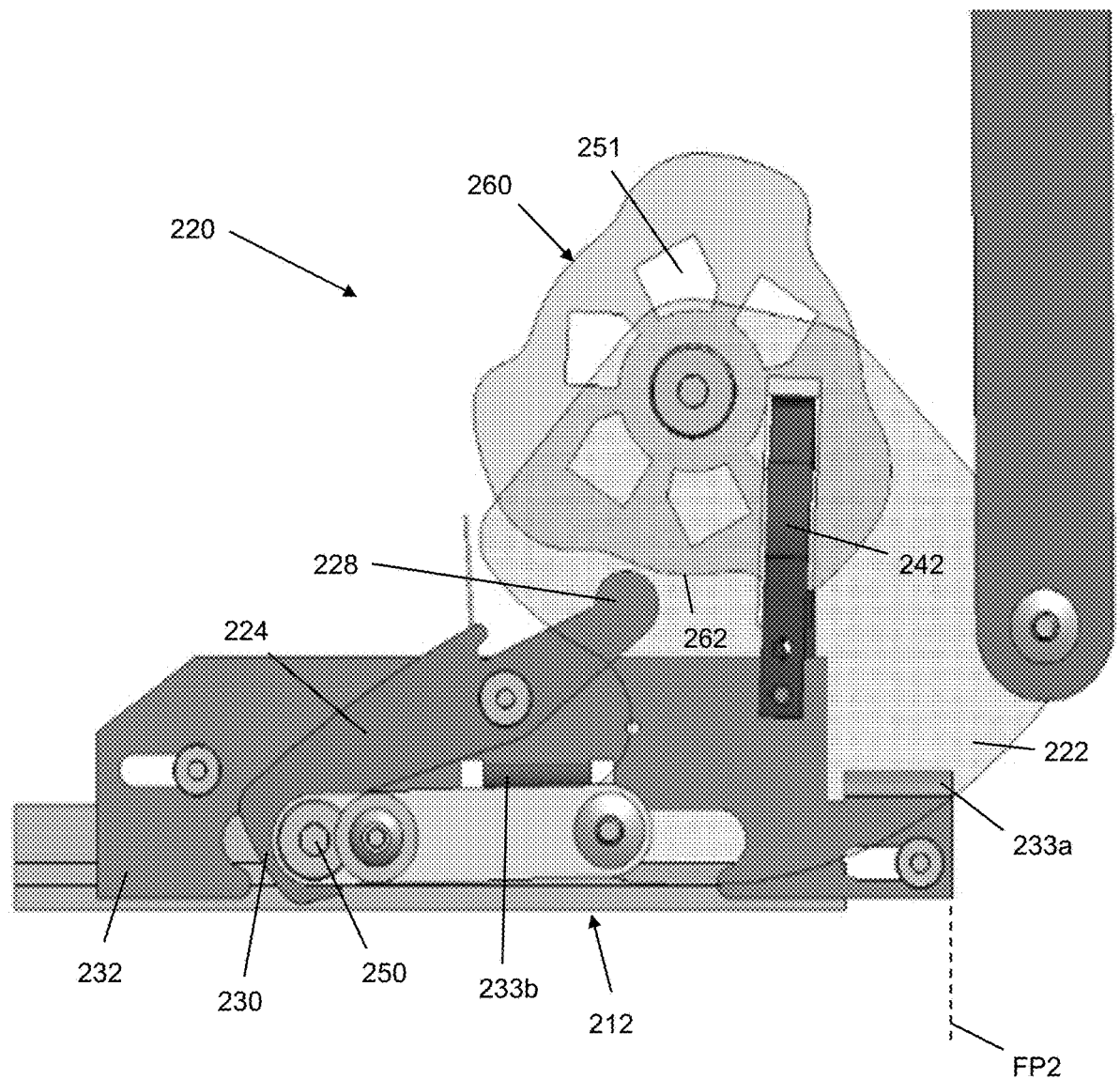

FIG. 16 shows the position of the plate advancement mechanism 220 system with the telescoping member 214 compressed fully downward, the yoke 280 has rotated the bell crank 222 clockwise and the arm 215 and cross pin 250 have moved the shuttle 212 to the feed position where the receptacle 216 of the shuttle 212 is beneath the stack 10. As can be seen, with the feed latch 224 in the latched position, the longitudinal extent for travel of the cross pin 250 through the slot 226 in the indexer 232 is shortened. As the cross pin 250 is pushed to the end of its longitudinal movement, it contacts the front end 230 of the feed latch and moves the indexer 232 to the second feed position FP2. In this position, the indexing tabs 233a, 233b are shifted into alignment with the P2 plate at the bottom of the stack, releasing the indexing edge 4 of the bottom plate in the stack, which falls to the floor of the receptacle 216 of the shuttle 212. In this position, the spring arm 242 carried by the bell crank 222 engages the edge of a slot 251 in the cam 260.

Figure 17:
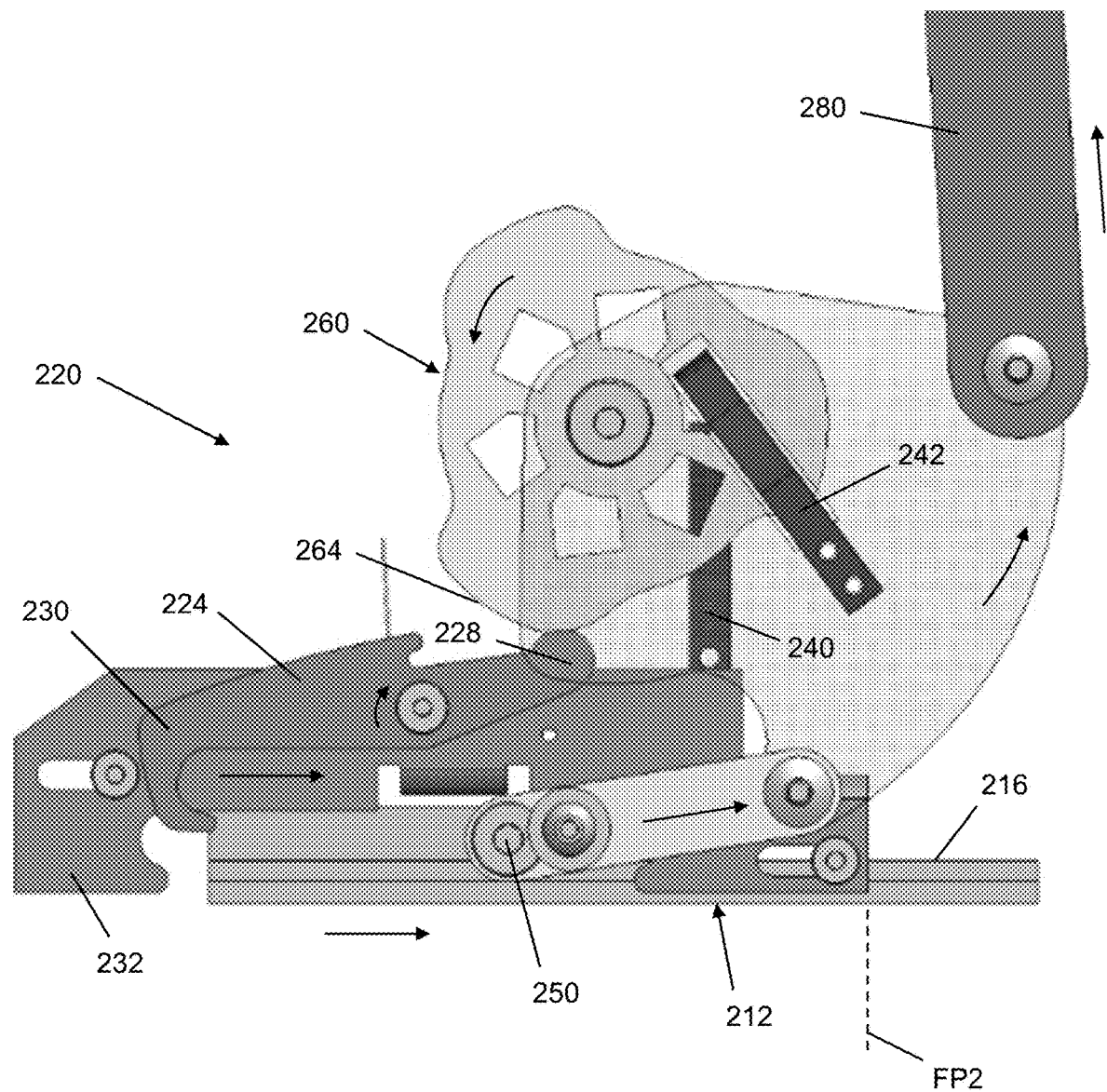

FIG. 17 depicts movement of the plate advancement mechanism as the telescoping member 214 is extending and yoke 280 is rotating the bell crank 222 counterclockwise. The spring arm 242 carried by the bell crank 222 is rotating the cam 260 counterclockwise, moving a radially protruding cam lobe 264 into engagement with the actuation end 228 of the feed latch 224. This pivots the feed latch 224 clockwise, moving the forward end 230 of the feed latch 224 out of the path of travel of the cross pin 250. Movement of the feed latch 224 to the raised position exposes the entire length of the slot 226 in the indexer 232.

Figure 18:
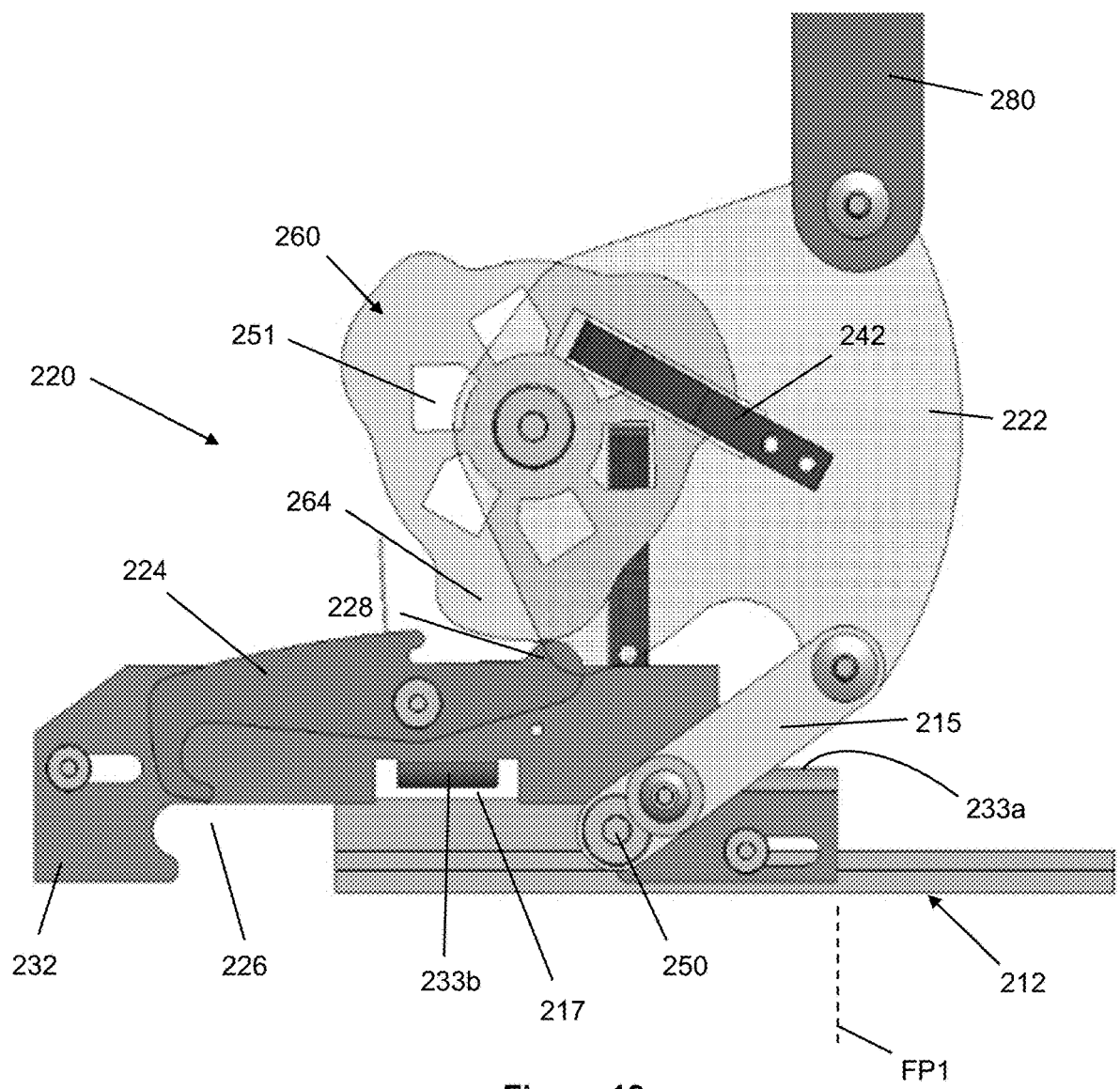

FIG. 18 depicts the plate advancement mechanism 220 with the telescoping member 214 extended and the bell crank 222 in the raised position. As can be seen, the cross pin 250 has contacted the end of the slot 226 in the indexer 232, shifting the indexer from the second feed position FP2 back to the first feed position FP1. This aligns feed tabs 233a and 233b with the indexing notches of a P1 plate at the bottom of the stack 10, releasing the indexing edge 4 of the bottom plate in the stack 10 to fall onto the raised platform 217 of the shuttle 212. This position of the roofing tool 200 and plate advancement mechanism 220 corresponds to that described in conjunction with FIG. 11.

FIG. 19 illustrates a shuttle 12, 212 compatible with the disclosed embodiments of a plate advancement mechanism 20, 220. The shuttle 212 may include an asymmetry 209 to assist in releasing a plate P1, P2 in the event a screw is not driven through the plate before the shuttle begins to move from the plate releasing position toward the feed position. This may occur if a screw has failed to feed or if the roofing machine 200 has run out of screws. It is desirable that the plate advancement mechanism 220 be able to feed and release individual plates P1, P2 even if no screws are present. FIG. 20 is a bottom view of the roofing tool 200 with the shuttle 212 in the plate release position, just before beginning to move back toward the feed position. FIG. 20 illustrates an asymmetry 211 in the opening defined by the body 210 of the roofing tool 200. FIG. 21 illustrates the plate advancement mechanism 220 from the perspective of the leading end of the shuttle. The rail 37 includes a downward projecting nose 38 that extends into a channel 221 defined by the shuttle receptacle 216. The nose 38 prevents a plate from remaining in the receptacle 216 when the shuttle 212 moves from the plate releasing position to the feed position by engaging one rear corner of the plate P1, P2 as the shuttle moves beneath the rail 37 toward the feed position. This can cause the plate to rotate, and the asymmetry 211 in the opening of the body 210 and the asymmetry 209 in the leading edge 13 of the shuttle 212 are configured to allow a rotated plate to be released from the roofing tool 200.

Figure 22A:
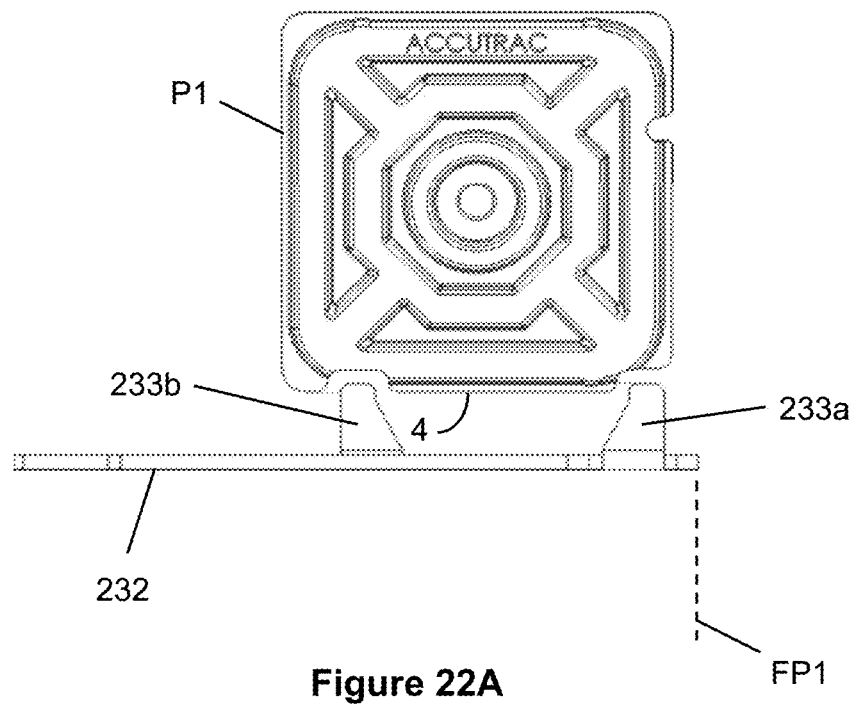
FIGS. 22A and 22B are top plan views of a roofing plate and an indexer, showing the position of the indexer to release the plate and support the plate, respectively.
Figure 22B:
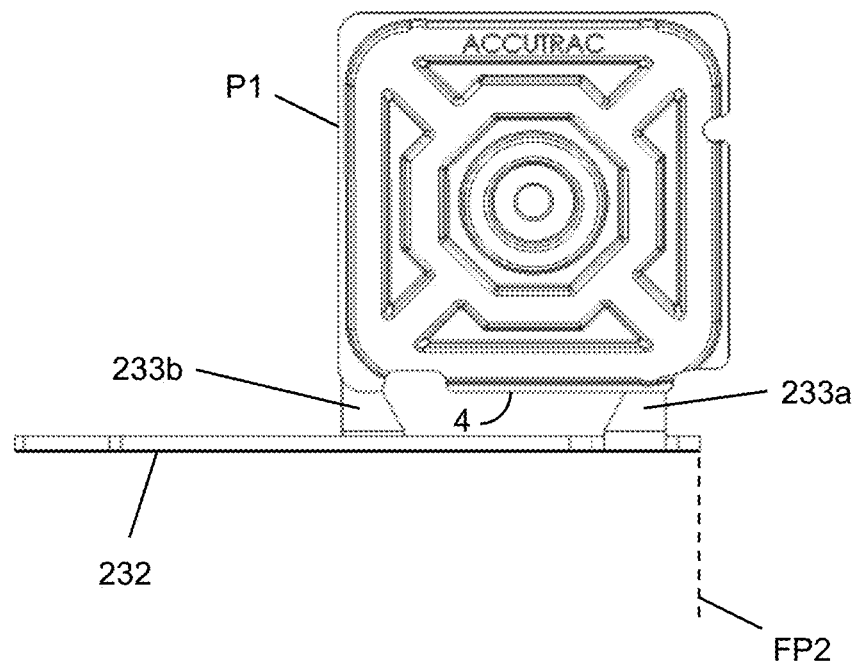

FIGS. 22A and 22B are top views showing the relative positions of the indexer and a P1 plate in the first feed position FP1 and the second feed position FP2. As shown in FIG. 22A, in the first feed position FP1, the indexing tabs 233a and 233b are aligned with the indexing notches in indexing edge 4 of the P1 plate. This would release the indexing edge 4 of the P1 plate as described in conjunction with FIGS. 11 and 18. As shown in FIG. 22B, in the second feed position FP2, the indexing tabs are not aligned with the indexing notches in the indexing edge 4 of the P1 plate and the P1 plate is supported. This represents how a plate is supported by the indexing tabs 233a, 233b after the bottom plate has been released. For example, when the bottom plate in the stack is a P2 plate and the indexer 232 is in the second feed position FP2, the P2 plate is released, but the P1 plate above it is supported and cannot be double fed.

While preferred embodiments of the foregoing have been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A plate advancement mechanism for separating individual roofing plates from a stack consisting of first roofing plates alternating with second roofing plates, said first and second roofing plates having an indexing edge with an indexing notch and a trailing edge perpendicular to the indexing edge, the indexing notch of the first plates located in a first position along said indexing edge and the indexing notch of the second plates located in a second position along said indexing edge, said plate advancement mechanism comprising:
    a body configured to accommodate the stack of roofing plates, said body defining an opening for receiving roofing plates and an opening beneath the stack of roofing plates for dispensing a lowermost plate from the stack;
    a shuttle mounted to the body for horizontal movement between a feed position and a plate releasing position, said shuttle including a projection configured to engage the trailing edge of a plate released from the stack onto the shuttle when the shuttle is in the feed position,
    an indexer mounted to the body for reciprocal movement parallel to the indexing edge of said roofing plates between a first feed position and a second feed position, said indexer including an indexing tab projecting beneath the indexing edge of said plates, said indexer first feed position aligning the indexing tab with the indexing notch of the first roofing plates and said indexer second feed position aligning said indexing tab with the indexing notch of the second roofing plates;
    wherein said indexer alternates between said first feed position and said second feed position in coordination with said shuttle to release the lowermost roofing plate from the stack onto the shuttle by aligning the indexing tab with the indexing notch of the lowermost plate, whereby the indexing edge of the lowermost plate is not supported by the indexing tab and falls onto said shuttle while the next plate in the stack is supported by the indexing tab, the projection of the shuttle engaging the trailing edge of the lowermost plate as the shuttle moves from the feed position to the plate releasing position to separate only the lowermost plate from the stack and move the lowermost plate to the dispensing position.

2. The plate advancement mechanism of claim 1, comprising a rail that supports an edge of the stack of roofing plates opposite the indexing edge, whereby the stack of roofing plates is supported by the rail on one side and by the indexing tab on the opposite side, and when the lowermost plate is released by alignment of the indexing tab with the indexing notch of the lowermost plate, the indexing edge of the lowermost plate is released while the opposite edge of the lowermost plate remains supported by the rail.

3. The plate advancement mechanism of claim 2, wherein said shuttle includes a raised platform and a recessed receptacle, with said raised platform beneath the stack when said shuttle is in the plate releasing position and said receptacle beneath said stack when said shuttle is in the feed position, said projection on the shuttle is a wall defining a rear limit of said receptacle, said wall perpendicular to the indexing edge of the plates and projecting upward from a floor of the receptacle to overlap the trailing edge of the lowermost plate when the shuttle is in the feed position and the indexing edge of the lowermost plate is resting on the floor of the receptacle without overlapping with any of the trailing edge of the next plate in the stack, which remains supported at the indexing edge by the indexing tab and by the rail.

4. The plate advancement mechanism of claim 1, comprising a cross pin extending through said body and said shuttle, opposite sides of said body defining slots parallel with a direction of movement of the shuttle between the feed position and the plate releasing position and said cross pin extending through said slots and through said indexer, said indexer overlapping with a path of travel of said cross pin at a cross pin position corresponding to the feed position of the shuttle, said indexer supporting a feed latch moveable between a latched position extending across said path of travel and a displaced position not extending across said path of travel, contact between said cross pin and said feed latch when said feed latch is in the latched position shifting said indexer from the first feed position to the second feed position, wherein said plate advancement mechanism is configured to move said feed latch from said latched position to said displaced position on alternate cycles of shuttle movement between the feed position and the plate dispensing position.

5. The plate advancement mechanism of claim 4, wherein said feed latch pivots on said indexer and is biased toward said latched position, said plate advancement mechanism including a cam contacting an actuation end of said feed latch to move the latch against said bias from the latched position to the displaced position.

6. The plate advancement mechanism of claim 5, wherein said cam includes a repeating pattern of lobes of first and second radial distance from an axis of rotation of the cam, the lobes alternately moving the feed latch from the latched position to the displaced position.

7. The plate advancement mechanism of claim 6, comprising a first pawl or first spring arm attached to the body and engaged with said cam to permit the cam to rotate only in one direction.

8. The plate advancement mechanism of claim 7, comprising a bell crank pivoting about an axis concentric with the axis of rotation of said cam between a lowered position and a raised position, said bell crank coupled to said cross pin wherein movement of said bell crank to the lowered position moves said shuttle to the feed position and opposite movement of the bell crank to the raised position moves the shuttle to the plate releasing position, said bell crank supporting a second pawl or second spring arm that engages with the cam during movement of the bell crank from the lowered position to the raised position to rotate the cam from a position where a lobe of the first radial height is in contact with the actuation end of the feed latch to a position where a lobe of the second radial height is in contact with the actuation end of the feed latch, said cam retained in a fixed position by said first pawl or first spring arm while said bell crank moves from the raised position to the lowered position, whereby the feed latch is in the latched and displaced positions during alternate cycles of the shuttle between the feed position and the plate dispensing position.

9. The plate advancement mechanism of claim 8, wherein said plate advancement mechanism is part of a roofing tool comprising a telescoping member biased toward an extended position and movable against the bias to a compressed position, said bell crank coupled to said telescoping member so that movement of said telescoping member from the extended position to the compressed position pivots the bell crank from the raised position to the lowered position and movement of the telescoping member from the compressed position to the extended position pivots the bell crank from the lowered position to the raised position.

10. The plate advancement mechanism of claim 3, wherein said wall overlaps with a majority of the indexing edge of the lowermost plate when the shuttle is in the feed position and the indexing edge of the lowermost plate is resting on a floor of the shuttle.

11. The plate advancement mechanism of claim 3, wherein movement of the indexer to the first feed position coincides with the shuttle being in the feed position, with the indexing edge of the lowermost plate released and falling to the floor of the receptacle, and movement of the indexer to the second feed position coincides with the shuttle being in the plate releasing position, with the indexing edge of the lowermost plate released and falling onto the raised platform, movement of the shuttle from the plate releasing position to the feed position allowing the indexing edge of the plate to fall from the raised platform onto the floor of the receptacle.

12. The plate advancement mechanism of claim 1, wherein each of said first and second roofing plates includes two indexing notches, the indexing notches of the first roofing plates located in a first pair of positions on said indexing edge, and the indexing notches of the second roofing plates located in a second pair of positions on said indexing edge, said indexer including two indexing tabs that align with the indexing notches of the first plates when the indexer is in the first feed position and the indexing tabs of the indexer align with the indexing notches of the second plates when the indexer is in the second feed position, the indexing edge of a plate above the lowermost plate in the stack supported by the indexing tabs at two spaced apart locations when the indexing edge of the lowermost plate in the stack is released.

\* \* \* \* \*